(12) United States Patent
Tamura

(10) Patent No.: US 9,200,201 B2
(45) Date of Patent: Dec. 1, 2015

(54) HEAT-INSULATING PARTICULATE PIGMENT AND INFRARED-REFLECTIVE COATING SOLUTION

(75) Inventor: Kentaro Tamura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 75 days.

(21) Appl. No.: 13/503,261

(22) PCT Filed: Oct. 13, 2010

(86) PCT No.: PCT/JP2010/067959
§ 371 (c)(1),
(2), (4) Date: Apr. 20, 2012

(87) PCT Pub. No.: WO2011/048989
PCT Pub. Date: Apr. 28, 2011

(65) Prior Publication Data
US 2012/0202084 A1     Aug. 9, 2012

(30) Foreign Application Priority Data

Oct. 22, 2009   (JP) .................................. 2009-243637

(51) Int. Cl.
| | |
|---|---|
| C08F 220/26 | (2006.01) |
| E04B 1/74 | (2006.01) |
| C09K 19/24 | (2006.01) |
| C03C 17/00 | (2006.01) |
| C09B 55/00 | (2006.01) |
| B32B 17/10 | (2006.01) |
| B32B 27/36 | (2006.01) |
| C09K 19/04 | (2006.01) |

(52) U.S. Cl.
CPC ........... *C09K 19/24* (2013.01); *B32B 17/10036* (2013.01); *B32B 17/10165* (2013.01); *B32B 17/10761* (2013.01); *C03C 17/007* (2013.01); *C09B 55/007* (2013.01); *C03C 2217/445* (2013.01); *C03C 2217/485* (2013.01); *C03C 2217/70* (2013.01); *C09K 2019/0448* (2013.01); *Y10T 428/31786* (2015.04)

(58) Field of Classification Search
None
See application file for complete search history.

(56) References Cited

U.S. PATENT DOCUMENTS

| | | |
|---|---|---|
| 2,367,661 A | 1/1945 | Agre |
| 2,367,670 A | 1/1945 | Christ |

(Continued)

FOREIGN PATENT DOCUMENTS

| | | |
|---|---|---|
| JP | 55-21479 A | 2/1980 |
| JP | 60-105667 A | 6/1985 |

(Continued)

OTHER PUBLICATIONS

International Search Report for PCT/JP2010/067959 dated Dec. 7, 2010.

(Continued)

*Primary Examiner* — Hoa (Holly) Le
*Assistant Examiner* — Thomas Mangohig
(74) *Attorney, Agent, or Firm* — Birch, Stewart, Kolasch & Birch, LLP

(57) ABSTRACT

Provided is a practical heat insulating particulate pigment having high heat insulating properties. Provided therefore is a heat insulating particulate pigment having a cholesteric resin layer with cholesteric regularity controlled such that, in a wavelength range of 800 nm to 1,900 nm, the cholesteric resin layer has a band of reflecting 40% or more of incident light with a bandwidth equal to or wider than 200 nm.

12 Claims, 5 Drawing Sheets

(56) References Cited

U.S. PATENT DOCUMENTS

| | | | |
|---|---|---|---|
| 2,448,828 | A | 9/1948 | Renfrew |
| 2,722,512 | A | 11/1955 | Crandall |
| 2,951,758 | A | 9/1960 | Notley |
| 3,046,127 | A | 7/1962 | Barney et al. |
| 3,549,367 | A | 12/1970 | Chang et al. |
| 4,212,970 | A | 7/1980 | Iwasaki |
| 4,239,850 | A | 12/1980 | Kita et al. |
| 4,293,435 | A | 10/1981 | Portugall et al. |
| 4,619,998 | A | 10/1986 | Buhr |
| 4,696,888 | A | 9/1987 | Buhr |
| 5,332,522 | A | 7/1994 | Chen et al. |
| 5,506,704 | A | 4/1996 | Broer et al. |
| 5,593,617 | A | 1/1997 | Kelly et al. |
| 5,793,456 | A | 8/1998 | Broer et al. |
| 6,180,028 | B1 | 1/2001 | Hotaka et al. |
| 6,207,770 | B1 | 3/2001 | Coates et al. |
| 6,217,792 | B1 | 4/2001 | Parri et al. |
| 6,410,130 | B1 | 6/2002 | Schuhmacher et al. |
| 6,468,444 | B1 | 10/2002 | Meyer et al. |
| 6,699,405 | B2 | 3/2004 | Prechtl et al. |
| 6,773,766 | B2 | 8/2004 | Meyer et al. |
| 6,800,337 | B1 | 10/2004 | Siemensmeyer et al. |
| 6,805,920 | B2 | 10/2004 | Nakano et al. |
| 6,879,362 | B2 | 4/2005 | Kawabata |
| 7,452,608 | B2 | 11/2008 | Fukatani et al. |
| 7,632,568 | B2 | 12/2009 | Padiyath et al. |
| 7,652,736 | B2 | 1/2010 | Padiyath et al. |
| 7,732,042 | B2 | 6/2010 | Fukatani et al. |
| 7,736,532 | B2 | 6/2010 | Silverman et al. |
| 7,744,970 | B2 | 6/2010 | Silverman et al. |
| 7,749,577 | B2 | 7/2010 | Goldfinger et al. |
| 7,754,912 | B2 | 7/2010 | Irisawa et al. |
| 7,771,616 | B2 | 8/2010 | Irisawa et al. |
| 8,158,021 | B2 | 4/2012 | Sakamoto et al. |
| 8,202,922 | B2 | 6/2012 | Botel et al. |
| 2007/0152188 | A1 | 7/2007 | Silverman et al. |
| 2009/0269502 | A1 | 10/2009 | Kanno et al. |
| 2010/0263790 | A1 | 10/2010 | Goldfinger et al. |
| 2012/0202084 | A1 | 8/2012 | Tamura |
| 2013/0107191 | A1 | 5/2013 | Tsai |

FOREIGN PATENT DOCUMENTS

| | | | |
|---|---|---|---|
| JP | 62-70406 | A | 3/1987 |
| JP | 6-281814 | A | 10/1994 |
| JP | 8-104870 | A | 4/1996 |
| JP | 8-209127 | A | 8/1996 |
| JP | 11-100575 | A | 4/1999 |
| JP | 11-130729 | A | 5/1999 |
| JP | 2000-505485 | A | 5/2000 |
| JP | 2001-262144 | A | 9/2001 |
| JP | 2001-515094 | A | 9/2001 |
| JP | 2001-519317 | A | 10/2001 |
| JP | 2002-30042 | A | 1/2002 |
| JP | 2002-265421 | A | 9/2002 |
| JP | 2002-308832 | A | 10/2002 |
| JP | 2002-533742 | A | 10/2002 |
| JP | 2003-66214 | A | 3/2003 |
| JP | 2003-131187 | A | 5/2003 |
| JP | 2003-313187 | A | 11/2003 |
| JP | 2004-204190 | A | 7/2004 |
| JP | 2005-206445 | A | 8/2005 |
| JP | 2005-263789 | A | 9/2005 |
| JP | 2005-309255 | A | 11/2005 |
| JP | 2007-119415 | A | 5/2007 |
| JP | 2007-186430 | A | 7/2007 |
| JP | 2008-170835 | A | 7/2008 |
| JP | 2008-528313 | A | 7/2008 |
| JP | 2008-242349 | A | 10/2008 |
| JP | 2008-542065 | A | 11/2008 |
| JP | 2008-291218 | A | 12/2008 |
| JP | 2008-545556 | A | 12/2008 |
| JP | 2009-514022 | A | 4/2009 |
| JP | 2009-522399 | A | 6/2009 |
| WO | WO 98/00428 | A1 | 1/1998 |
| WO | WO 2008/007782 | A1 | 1/2008 |
| WO | WO 2009/041512 | A1 | 4/2009 |
| WO | WO 2009/133290 | A2 | 11/2009 |
| WO | WO 2011/007796 | A1 | 1/2011 |

OTHER PUBLICATIONS

The document titled JP-2009/041512-A1 is actually a machine translation of WO-2009/041512-A1, which published on Apr. 2, 2009.

International Search Report for PCT/JP2011/054180 dated May 24, 2011.

U.S. Office Action for U.S. Appl. No. 13/582,915 dated Jan. 30, 2014.

HEAT-INSULATING PARTICULATE PIGMENT AND INFRARED-REFLECTIVE COATING SOLUTION

FIELD

The present invention relates to a heat insulating particulate pigment and to an infrared reflective coating solution. Particularly, the invention relates to a heat insulating particulate pigment including a cholesteric resin layer that has a high reflection ratio for infrared radiation in the wavelength range in which the amount of solar energy is high and has a high light transmittance in the visible light range.

BACKGROUND

From the viewpoint of promoting energy saving, infrared radiation heat insulating layers that can improve air conditioning efficiency are recently receiving attention. Considering that the infrared radiation heat insulating layers are used for window panes, exterior walls, etc. of automobiles and buildings, it is important that the layer has high light transmittance in the wavelength range of about 400 nm to about 750 nm, i.e., in the visible light range. However, it is desirable, from the viewpoint of heat insulating effects, that the layer reflects a large amount of near infrared radiation in the range of about 900 nm to about 1,300 nm in which the amount of solar energy is high. The near infrared range is a wavelength range very close to the visible light range. Therefore, in order to achieve these demands in a balanced manner, it is desirable that the heat insulating layer for use has reflection characteristics that changes in an extremely sharp manner between the near infrared range and the visible light range.

However, with conventional materials for heat insulating layers, only a broad gradual change in reflection characteristics can be obtained between the near infrared range and the visible light range, and it has been difficult to achieve the balance between the aforementioned demands. One method that has been proposed to reduce the aforementioned difficulty is to use a heat insulating layer using a cholesteric liquid crystal (for example, Patent Literatures 1 and 2).

CITATION LIST

Patent Literature

Patent Literature 1: Japanese Translation of PCT International Application No. 2009-522399 A Patent Literature 2: Japanese Patent Application Laid-Open No. 2001-262144 A

SUMMARY

Technical Problem

Patent Literature 1 discloses a composition containing a near infrared absorption material and a cholesteric liquid crystal and also discloses the formation of a near infrared reflecting layer using the composition. However, the technique described in Patent Literature 1 requires an orientation layer and rubbing treatment in order to form the near infrared reflecting layer, and is therefore insufficient in productivity.

In addition, since the composition described in Patent Literature 1 contains a near infrared absorber, the near infrared reflecting layer absorbs light, and then causes heat accumulation and re-radiation. In addition, since most of near infrared absorbers have absorption in the visible light range, the near infrared reflecting layer may be colored, and the transmittance in the visible light range may deteriorate.

Patent Literature 2 discloses liquid crystal interference fine particles that is produced using a cholesteric liquid crystal. However, the liquid crystal interference fine particles described in Patent Literature 2 are non-cross-linked particles, and therefore has poor heat resistance. Since the liquid crystal interference fine particles described in Patent Literature 2 has a large particle size, it is difficult to eliminate orientation defects of the liquid crystal. Therefore, the member containing the liquid crystal interference fine particles has high haze and poor transparency. In addition, since the optically active compound contained in the particles is non-reactive, bleeding occurs, and reflection characteristics are thereby deteriorated.

The technologies in Patent Literatures 1 and 2 thus have problems in practical use. In addition, in the technologies in Patent Literatures 1 and 2, effective light reflection bandwidth is narrow, and therefore sufficient heat insulating properties cannot be obtained.

The present invention has been made in view of the foregoing problems, and it is an object of the present invention to provide a practical heat insulating particulate pigment and a practical infrared reflective coating solution that have high heat insulating properties.

Solution to Problem

To solve the foregoing problems and achieve the object, the present inventor has made extensive studies and found out practical heat insulating particles having a high reflection ratio for infrared radiation in the wavelength range of about 900 nm to about 1,300 nm in which the amount of solar energy is high and having high heat insulating properties. Such particles include a cholesteric resin layer with its cholesteric regularity controlled such that, in the infrared wavelength range, the layer has a band of reflecting a specific ratio or more of incident light with a bandwidth equal to or wider than a specific width. Thus, the invention has been completed.

That is, the gist of the present invention is as [1] to [6] below.

[1] A heat insulating particulate pigment comprising a cholesteric resin layer with cholesteric regularity controlled such that, in a wavelength range of 800 nm to 1,900 nm, the cholesteric resin layer has a band of reflecting 40% or more of incident light with a bandwidth equal to or wider than 200 nm.

[2] The heat insulating particulate pigment according to [1], wherein the cholesteric resin layer is a resin layer obtained by curing a liquid crystal composition containing a liquid crystal compound having a refractive index anisotropy Δn of 0.21 or more.

[3] The heat insulating particulate pigment according to [1] or [2], wherein the cholesteric resin layer is formed from a liquid crystal composition containing a compound represented by the formula (1):

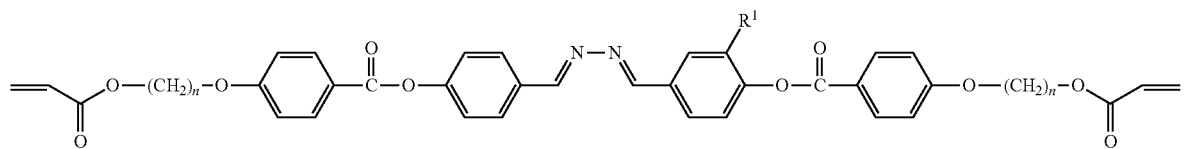

(1)

(in the formula (1), $R^1$ represents one selected from the group consisting of a hydrogen atom, halogen atoms, alkyl groups having 1 to 10 carbon atoms, $—OR^3$, $—O—C(=O)—R^3$, and $—C(=O)—OR^3$, wherein $R^3$ represents a hydrogen atom or an optionally substituted alkyl group having 1 to 10 carbon atoms, wherein, when $R^3$ is an alkyl group, —O—, —S—, —O—C(=O)—, —C(=O)—O—, —O—C(=O)—O—, —$NR^4$—C(=O)—, —C(=O)—$NR^4$—, —$NR^4$—, or —C(=O)— may be inserted into the alkyl group (excluding the case in which two or more —O—'s or —S—'s are inserted at adjacent sites), wherein $R^4$ represents a hydrogen atom or an alkyl group having 1 to 6 carbon atoms, and each n independently represents an integer from 2 to 12).

[4] The heat insulating particulate pigment according to [3], wherein the compound represented by the formula (1) is a compound represented by formula (2):

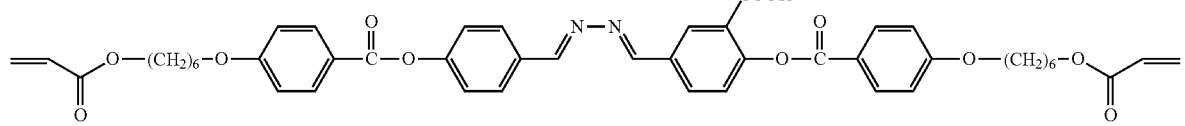

(2)

(in the formula (2), $R^2$ represents an alkyl group having 1 to 10 carbon atoms, and —O—, —S—, —O—C(=O)—, or —C(=O)—O— may be inserted into in the alkyl group (excluding the case in which two or more —O—'s or —S—'s are inserted at in adjacent sites)).

[5] The heat insulating particulate pigment according to any one of [1] to [4] comprising two cholesteric resin layers, and a layer disposed between the two cholesteric resin layers and having a phase difference of ½ wavelength.

[6] An infrared reflective coating solution comprising the heat insulating particulate pigment according to any one of [1] to [5].

Advantageous Effects of Invention

The heat insulating particulate pigment of the present invention can efficiently reflect infrared radiation having a large amount of energy and has high heat insulating properties.

The infrared reflective coating solution of the present invention forms a coating layer that can efficiently reflect infrared radiation having a large amount of energy and has high heat insulating properties.

DESCRIPTION OF EMBODIMENTS

Figure 1:
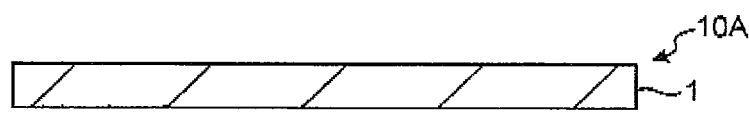
FIG. 1 is a schematic cross-sectional view illustrating the layer structure of a heat insulating particulate pigment of the present invention.

The present invention will be described in detail with referring to embodiments, exemplifications, etc. However, the present invention is not limited to these embodiments, exemplifications, etc. and can be arbitrarily modified for implementation without departing from the gist of the present invention and equivalents thereof.

[1. Structure of Heat Insulating Particulate Pigment]

A heat insulating particulate pigment of the present invention is a particle including a cholesteric resin layer with its cholesteric regularity controlled such that, in the wavelength range of 800 nm to 1,900 nm, the cholesteric resin layer has a band of reflecting 40% or more of incident light with a bandwidth equal to or wider than 200 nm (hereinafter/such a layer is appropriately referred to as a "controlled cholesteric resin layer"). The heat insulating particulate pigment of the present invention may include a layer other than the controlled cholesteric resin layer.

[1.1. Controlled Cholesteric Resin Layer]

As described above, the controlled cholesteric resin layer is a cholesteric resin layer with its cholesteric regularity controlled such that, in the wavelength range of 800 nm to 1,900 nm, the layer has a band of reflecting 40% or more of incident light with a bandwidth equal to or wider than 200 nm.

The "cholesteric regularity" is a structure in which angles of molecular axes are displaced (twisted) plane-by-plane about the normal direction of the planes in a manner such that the axes of molecules in one plane are oriented in a certain direction, and the axes of molecules in an adjacent plane are displaced by a small angle, and the angles of the axes of molecules in a subsequently adjacent plane are further displaced. Such a structure in which the directions of molecular axes are sequentially twisted is referred to as a chiral structure. Preferably, the normal direction of the planes (a chiral axis) is substantially parallel to the direction of the thickness of the cholesteric resin layer.

The "cholesteric resin layer" is a resin layer having cholesteric regularity. The molecules exhibiting cholesteric regularity in the cholesteric resin layer are molecules contained in the cholesteric resin layer and are usually molecules of a liquid crystal compound or molecules of a polymer that has been obtained using, e.g., the liquid crystal compound.

The phrase "with its cholesteric regularity controlled such that, in the wavelength range of 800 nm to 1,900 nm, the layer has a band of reflecting 40% or more of incident light with a bandwidth equal to or wider than 200 nm" means that the cholesteric resin layer is formed with the period of the cholesteric regularity being changed such that, in the wavelength range of 800 nm to 1,900 nm, the layer has a band of reflecting 40% or more of incident light with a bandwidth equal to or wider than 200 nm. In the controlled cholesteric resin layer, the width of the band of reflecting 40% or more of incident light within the wavelength range of 800 nm to 1,900 nm is preferably equal to or wider than 300 nm and more preferably equal to or wider than 400 nm.

When light is incident on the cholesteric resin layer having a cholesteric regularity, one of anticlockwise circularly polarized light and clockwise circularly polarized light in a particular wavelength range is reflected. Light other than the reflected circularly polarized light is transmitted. The particular wavelength range in which circularly polarized light is reflected is a selective reflection band.

In the chiral structure, when a screw axis representing the rotation axis when the molecular axes are twisted is parallel to the normal direction of the cholesteric resin layer, the pitch length p of the chiral structure and the wavelength λ of the reflected circularly polarized light satisfy the relations represented by the formulae (A) and (B).

$$\lambda_c = n \times p \times \cos\theta \quad \text{Formula (A)}$$

$$n_o \times p \times \cos\theta \leq \lambda \leq n_e \times p \times \cos\theta \quad \text{Formula (B)}$$

In the formulae (A) and (B), $\lambda_c$ represents the center wavelength in the selective reflection band, $n_o$ represents the refractive index of the liquid crystal compound in the minor axis direction, $n_e$ represents the refractive index of the liquid crystal compound in the major axis direction, n represents $(n_e + n_o)/2$, p represents the pitch length of the chiral structure, and θ represents the incident angle of light (the angle with respect to the normal direction of the planes).

That is, the center wavelength $\lambda_c$ of the selective reflection band depends on the pitch length p of the chiral structure in the cholesteric resin layer. The selective reflection band may be changed by changing the pitch length of the chiral structure.

From the viewpoint of preventing disturbance in the orientation and a reduction in transmittance, the viewpoint of the width of the wavelength range of selective reflection (reflection wavelength range), etc., the thickness of the controlled cholesteric resin layer is usually 1 μm or more and preferably 3 μm or more and is usually 100 μm or less, preferably 50 μm, or less, more preferably 20 μm or less, still more preferably 15 μm or less, and particularly preferably 10 μm or less.

The number of the layers of the controlled cholesteric resin layers that the heat insulating particulate pigment of the present invention has may be one layer or two or more layers. It is preferable that the number of controlled cholesteric resin layers is two or more, because the wavelength bandwidth of possible light reflection can be widened, i.e., bandwidth broadening can be achieved.

No limitation is imposed on the method for producing the controlled cholesteric resin layer in the invention, so long as the cholesteric resin layer produced has cholesteric regularity controlled such that, in the wavelength range of 800 nm to 1,900 nm, the layer has a band of reflecting 40% or more of incident light with a bandwidth equal to or wider than 200 nm. The controlled cholesteric resin layer is usually produced by preparing a liquid crystal composition containing a liquid crystal compound, coating a surface of a substrate with the liquid crystal composition, and if necessary curing it by drying etc.

A liquid crystal polymer being a polymer form, a polymerizable liquid crystal compound being a monomer form, or a combination thereof may be used as the liquid crystal compound. However, it is preferable that the liquid crystal compound for use has a large refractive index anisotropy Δn. More specifically, the refractive index anisotropy Δn is usually 0.21 or more, preferably 0.22 or more, and more preferably 0.23 or more. As can be seen from the aforementioned formula (B), since the bandwidth Δλ of circularly polarized light that can be reflected depends on the difference between $n_e$ and $n_o$ and therefore depends on the refractive index anisotropy Δn of the liquid crystal compound, large refractive index anisotropy Δn results in tendency in wide bandwidth Δλ of the circularly polarized light that can be reflected. The larger the refractive index anisotropy Δn of the liquid crystal compound, the more preferred, although the refractive index anisotropy Δn is practically 0.35 or less.

Representative examples of the method for producing the controlled cholesteric resin layer may be the following method (a) and method (b).

Method (a): A liquid crystal composition is prepared by dissolving a liquid crystal polymer and, if necessary, a chiral agent, a surfactant, an orientation control agent, etc. in a solvent (hereinafter, this liquid crystal composition is appropriately referred to as a "liquid crystal polymer solution"). The prepared liquid crystal polymer solution is applied onto a substrate to be in a form of film and then dried. In this method, the cholesteric regularity is controlled such that, in the wavelength range of 800 nm to 1,900 nm, the obtained coating layer has a band of reflecting 40% or more of incident light with a bandwidth equal to or wider than 200 nm.

Method (b): A liquid crystal composition is prepared by dissolving a polymerizable liquid crystal compound, a polymerization initiator, a chiral agent, and, if necessary, a surfactant, an orientation control agent, etc. in a solvent (hereinafter, this liquid crystal composition is appropriately referred to as a "polymerizable liquid crystal composition"). The prepared polymerizable liquid crystal composition is applied onto a substrate to be in a form of film and then dried. The obtained coating layer is subjected to polymerization, and then the cholesteric regularity is controlled such that, in the wavelength range of 800 nm to 1,900 nm, the resulting coating layer has a band of reflecting 40% or more of incident light with a bandwidth equal to or wider than 200 nm.

Among the methods (a) and (b), the method (b) is preferred because an intended controlled cholesteric resin layer can be formed more efficiently.

Each of the methods (a) and (b) will be described hereinbelow.

Description of Method (a)

In the method (a), a liquid crystal polymer solution as a liquid crystal composition is first prepared by dissolving a liquid crystal polymer and, if necessary a chiral agent, a surfactant, an orientation control agent, etc. in a solvent.

(Liquid Crystal Polymer)

Examples of the liquid crystal polymer for use as a liquid crystal compound in the method (a) may include: a nematic liquid crystal polymer containing a low-molecular chiral agent; a liquid crystal polymer to which a chiral component has been introduced; and a mixture of a nematic liquid crystal polymer and a cholesteric liquid crystal polymer. The liquid crystal polymer to which a chiral component has been introduced is a liquid crystal polymer that itself serves as a chiral agent. As to the mixture of a nematic liquid crystal polymer and a cholesteric liquid crystal polymer, the pitch of the chiral structure of the nematic liquid crystal polymer may be controlled by changing the mixing ratio.

As the liquid crystal polymer, it may also be possible to use a liquid crystal polymer having cholesteric regularity imparted, e.g., by a method wherein a chiral component, a low-molecular chiral agent, etc. composed of a compound having an asymmetric carbon atom is introduced into a material including a para-substituted cyclic compound that provides nematic orientation and is composed of, e.g., a para-substituted aromatic unit or a para-substituted cyclohexyl unit of, e.g., the azomethine, azo, azoxy, ester, biphenyl, phenylcyclohexane, or bicyclohexane type (see Japanese Patent Application Laid-Open No. Sho. 55-21479 A and U.S. Pat. No. 5,332,522). Examples of the terminal substituents in para-positions in the para-substituted cyclic compound may include a cyano group, alkyl groups, and alkoxy groups.

As the liquid crystal polymer, one species thereof may be solely used, and a combination of two or more in any ratio may also be used.

No limitation is imposed on the method for producing the liquid crystal polymer. For example, the liquid crystal polymer is obtained by radical polymerization, cationic polymerization, or anionic polymerization of a monomer having a mesogenic structure. The monomer having a mesogenic structure may be obtained, e.g., by introducing a mesogenic group into a vinyl-based monomer such as an acrylate or a methacrylate directly or through a spacer by a known method. The liquid crystal polymer may also be obtained by an addition reaction of a vinyl-substituted mesogenic monomer through Si—H bonds in polyoxymethylsilylene in the presence of a platinum-based catalyst. The liquid crystal polymer may also be obtained by introducing a mesogenic group through a functional group that has been added to a main chain polymer by an esterification reaction using a phase transfer catalyst. The liquid crystal polymer may also be obtained by a polycondensation reaction of a diol and a monomer that has been obtained by introducing a mesogenic group into a part of malonic acid, if necessary, through a spacer.

(Chiral Agent)

Any known chiral agent may be used as the chiral agent for introducing a chiral component into the liquid crystal polymer and for, if necessary, adding to the liquid crystal polymer solution. Examples of such a chiral agent may include a chiral monomer described in Japanese Patent Application Laid-Open No. Hei. 06-281814 A, a chiral agent described in Japanese Patent Application Laid-Open No. Hei. 08-209127 A, and a photo-reactive chiral compound described in Japanese Patent Application Laid-Open No. 2003-131187 A.

In order to avoid an unexpected change in phase transition temperature caused by the chiral agent, it is preferable that the chiral agent itself exhibits liquid crystal properties. From the viewpoint of economical efficiency, it is preferable to use a chiral agent having large HTP ($=1/p \cdot c$), which is an index of the efficiency of twisting the liquid crystal polymer. Here, p represents the pitch length of the chiral structure, and c represents the concentration of the chiral agent. The pitch length of the chiral structure is a distance in the direction of the chiral axis from a plane in the chiral structure to another plane in which the direction of the molecular axis whose angle is displaced in a plane-by-plane manner returns to the original molecular axis direction.

As to the chiral agent, one species thereof may be solely used, and a combination of two or more in any ratio may also be used.

The specific type and amount of the chiral agent may be set such that the produced controlled cholesteric resin layer has desired optical properties.

(Formation of Liquid Crystal Polymer Solution Film)

In the method (a), the prepared liquid crystal polymer solution is applied onto a substrate to be in a form of film, and then dried, to obtain a controlled cholesteric resin layer as a coating layer.

The substrate for use may be any of substrates formed of conventionally used materials that may be including or inorganic materials. A transparent substrate is preferred. Examples of the material of the transparent substrate may include: transparent resin substrates of polycycloolefin (for example, ZEONEX and ZEONOR (registered trademarks; products of ZEON CORPORATION), ARTON (registered trademark; a product of JSR Corporation), APEL (registered trademark; a product of Mitsui Chemicals, Inc.), polyethylene terephtalate, polycarbonate, polyimide, polyamide, polymethyl methacrylate, polystyrene, polyvinyl chloride, polytetrafluoroethylene, cellulose, cellulose triacetate, polyether sulfone, or the like as organic materials; and silicon, glass, calcite, or the like as inorganic materials. Of these, organic materials are preferred.

The substrate for use is usually a substrate in a shape of film. Such a substrate may be a single layer substrate or a stacked body. When a stacked body is used, it may be a combination of organic and inorganic materials, a combination of only organic materials, or a combination of only inorganic materials.

An orientation film may be used for forming the controlled cholesteric resin layer. The orientation film is usually formed on the surface of the substrate for regulating the orientation in one in-plane direction in the cholesteric resin layer having cholesteric regularity.

The orientation film contains a polymer such as polyimide, polyvinyl alcohol, polyester, polyarylate, polyamide imide, polyether imide, or polyamide. The orientation film is obtained, e.g., by applying a solution containing such a polymer (a composition for the orientation film) onto a substrate to form a film, drying the film, and subjecting the film to rubbing treatment in one direction.

The thickness of the orientation film is usually 0.01 μm or more and preferably 0.05 μm or more and is usually 5 μm or less and preferably 1 μm or less.

In the method (a), the orientation film or the substrate may be subjected to rubbing treatment before the application of the liquid crystal polymer solution. No particular limitation is imposed on the method of rubbing treatment. In one exemplary rubbing treatment method, the orientation film is rubbed in one direction with a roller wound with felt or cloth composed of synthetic fibers such as nylon or natural fibers such as cotton. In order to remove fine powder (unwanted matter) generated during rubbing treatment and make the surface of the orientation film clean, it is preferable to clean the orientation film with, e.g., isopropyl alcohol after rubbing treatment.

The function of controlling the orientation of the cholesteric resin layer having cholesteric regularity in one plane direction may be given to the orientation film not only by the rubbing treatment method but also by a method including irradiating the surface of the orientation film with polarized ultraviolet light.

In the method (a), no limitation is imposed on the method for applying the liquid crystal polymer solution onto a substrate in a form of film. Examples of the method may include known coating methods such as spin coating, roller coating, flow coating, printing, dip coating, flow cast film forming, bar coating, die coating, and gravure printing.

After the application of the liquid crystal polymer solution, drying may be performed for obtaining a controlled cholesteric resin layer containing the liquid crystal polymer, as a cured coating layer. The temperature of drying is usually in the range of 40° C. to 150° C.

In the method (a), in order to control the cholesteric regularity of the liquid crystal polymer layer formed in a shape of film on the substrate such that, in the wavelength range of 800 nm to 1,900 nm, the layer has a band of reflecting 40% or more of incident light with a bandwidth equal to or wider than 200 nm, the type and amount of the chiral agent added to the liquid crystal polymer solution may be appropriately set, or the chiral component to be introduced into the liquid crystal polymer may be suitably selected. When a mixture of a nematic liquid crystal polymer and a cholesteric liquid crystal polymer is used, the pitch of the chiral structure of the nematic liquid crystal polymer may be controlled by changing the mixing ratio.

Description of Method (b)

In the method (b), a polymerizable liquid crystal composition is first prepared as a liquid crystal composition obtained by dissolving a polymerizable liquid crystal compound, a polymerization initiator, a chiral agent, and, if necessary, a surfactant, an orientation control agent, etc. in a solvent.

(Polymerizable Liquid Crystal Compound)

Examples of the polymerizable liquid crystal compound for use as a liquid crystal compound in the method (b) may include those described in Japanese Patent Application Laid-Open Nos. Hei. 11-130729 A, Hei. 08-104870 A, 2005-309255 A, 2005-263789 A, 2002-308832 A, 2002-265421 A, Sho. 62-070406 A, Hei. 11-100575 A, 2008-291218 A, and 2008-242349 A, Japanese Translation of PCT International Application Nos. 2001-519317 A and 2002-533742 A, WO2009/133290, and Japanese Patent Application No. 2008-170835.

Of these, a compound represented by the following formula (1) is preferred.

(1)

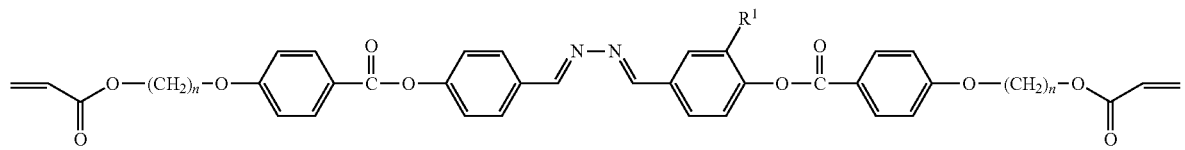

In the formula (1), $R^1$ represents any one selected from the group consisting of: a hydrogen atom; halogen atoms such as a fluorine atom, a chlorine atom, and a bromine atom; alkyl groups having 1 to 10 carbon atoms such as a methyl group, an ethyl group, a n-propyl group, an isopropyl group, a n-butyl group, an isobutyl group, a t-butyl group, a n-pentyl group, a n-hexyl group, and a n-heptyl group; —$OR^3$; —O—C(=O)—$R^3$; and —C(=O)—$OR^3$.

Here, $R^3$ represents a hydrogen atom or an alkyl group having 1 to 10 carbon atoms and optionally having a substituent. When $R^3$ is an alkyl group having 1 to 10 carbon atoms and optionally having a substituent, examples of the alkyl group having 1 to 10 carbon atoms may include a methyl group, an ethyl group, a n-propyl group, an isopropyl group, a n-butyl group, a sec-butyl group, a t-butyl group, a n-pentyl group, and a n-hexyl group. Of these, alkyl groups having 1 to 4 carbon atoms such as a methyl group, an ethyl group, a n-propyl group, an isopropyl group, and a n-butyl group are preferred.

When $R^3$ is an alkyl group having 1 to 10 carbon atoms and optionally having a substituent, examples of the optional substituent that the alkyl group may have may include: halogen atoms such as a fluorine atom, a chlorine atom, a bromine atom, and an iodine atom; and alkoxy groups having 1 to 6 carbon atoms such as a methoxy group, an ethoxy group, a n-propoxy group, an isopropoxy group, a n-butoxy group, a sec-butoxy group, a t-butoxy group, a n-pentyloxy group, and a n-hexyloxy group. The number of substituents that the alkyl group have may be one or two or more, and the number of species of substituents contained in the alkyl group may be one or two or more.

When $R^3$ is an alkyl group, —O—, —S—, —O—C(=O)—, —C(=O)—O—, —O—C(=O)—O—, —$NR^4$—

C(=O)—, —C(=O)—NR$^4$—, —NR$^4$—, or —C(=O)— may be inserted into the alkyl group (excluding the case in which two or more —O—'s or —S—'s are inserted at adjacent sites).

R$^4$ represents a hydrogen atom or an alkyl group having 1 to 6 carbon atoms such as a methyl group, an ethyl group, a n-propyl group, an isopropyl group, a n-butyl group, a sec-butyl group, a t-butyl group, a n-pentyl group, or a n-hexyl group.

Each n independently represents an integer from 2 to 12 and is preferably 6.

Particularly, it is preferable that R$^1$ is a group represented by —C(=O)—OR$^2$. R$^2$ represents an alkyl group having 1 to 10 carbon atoms, and —O—, —S—, —O—C(=O)—, or —C(=O)—O— may be inserted into in the alkyl group (excluding the case in which two or more —O—'s or —S—'s are inserted at adjacent sites). Particularly, R$^2$ is preferably a methyl group.

Therefore, the aforementioned compound represented by formula (1) is preferably a compound represented by the formula (2) below. R$^2$ in the formula (2) is the same as that in formula (1).

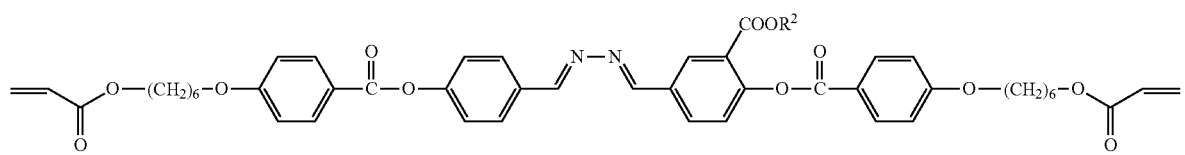

(2)

As the polymerizable liquid crystal compound, one species thereof may be solely used, and a combination of two or more thereof in any ratio may also be used.

The aforementioned compound represented by the formula (1) may be produced by a combination of methods known in organic synthetic chemistry, e.g., by a method described in Japanese Patent Application Laid-Open No. 2008-291218 A.

(Additional Copolymerizable Monomer)

In the method (b), the polymerizable liquid crystal compound is polymerized, and the controlled cholesteric resin layer is formed as a resin layer containing a polymer obtained by the polymerization (a liquid crystal macromolecule or a liquid crystal polymer). Examples of the polymer obtained by polymerization of the polymerizable liquid crystal compound may include a homopolymer obtained by homopolymerization of a polymerizable liquid crystal compound, a copolymer of two or more polymerizable liquid crystal compounds, and a copolymer of a polymerizable liquid crystal compound and an additional copolymerizable monomer.

Examples of the additional copolymerizable monomer may include 4-(2-methacryloyloxyethyloxy)benzoic acid-4'-methoxyphenyl ester, 4-(6-methacryloyloxyhexyloxy)benzoic acid biphenyl ester, 4-(2-acryloyloxyethyloxy)benzoic acid-4'-cyanobiphenyl ester, 4-(2-methacryloyloxyethyloxy)benzoic acid-4'-cyanobiphenyl ester, 4-(2-methacryloyloxyethyloxy)benzoic acid-3',4'-difluorophenyl ester, 4-(2-methacryloyloxyethyloxy)benzoic acid naphthyl ester, 4-acryloyloxy-4'-decylbiphenyl, 4-acryloyloxy-4'-cyanobiphenyl, 4-(2-acryloyloxyethyloxy)-4'-cyanobiphenyl, 4-(2-methacryloyloxyethyloxy)-4'-methoxybiphenyl, 4-(2-methacryloyloxyethyloxy)-4'-(4''-fluorobenzyloxy)-biphenyl, 4-acryloyloxy-4'-propylcyclohexyl phenyl, 4-methacryloyl-4'-butylbicyclohexyl, 4-acryloyl-4'-amyltolan, 4-acryloyl-4'-(3,4-difluorophenyl)bicyclohexyl, 4-(2-acryloyloxyethyl) benzoic acid (4-amylphenyl)ester, and 4-(2-acryloyloxyethyl)benzoic acid (4-(4'-propylcyclohexyl) phenyl)ester. As to the additional copolymerizable monomer, one species thereof may be solely used, and a combination of two or more species thereof in any ratio may also be used.

The amount of the additional copolymerizable monomer that the polymerizable liquid crystal composition contains is preferably 50 wt % or less, and more preferably 30 wt % or less based on the total amount of polymerizable monomers (i.e., the total amount of the polymerizable liquid crystal compound and the additional copolymerizable monomer). In the aforementioned range, a polymer having a high glass transition temperature (Tg) and a high film hardness can be obtained by polymerization.

(Polymerization Initiator)

Any of a thermal polymerization initiator and a photo-polymerization initiator may be used as the polymerization initiator to be contained in the polymerizable liquid crystal composition. Of these, a photo-polymerization initiator is preferred because a controlled cholesteric resin layer having controlled cholesteric regularity can be obtained easily and efficiently.

Examples of the photo-polymerization initiator may include polynuclear quinone compounds (U.S. Pat. Nos. 3,046,127 and 2,951,758), oxadiazole compounds (U.S. Pat. No. 4,212,970), α-carbonyl compounds (U.S. Pat. Nos. 2,367,661 and 2,367,670), acyloin ethers (U.S. Pat. No. 2,448,828), α-hydrocarbon-substituted aromatic acyloin compounds (U.S. Pat. No. 2,722,512), a combination of a triarylimidazole dimer and p-aminophenyl ketone (U.S. Pat. No. 3,549,367), and acridine and phenazine compounds (Japanese Patent Application Laid-Open No. Sho. 60-105667 A and U.S. Pat. No. 4,239,850).

As to the polymerization initiator, one species thereof may be solely used, and a combination of two or more species thereof in any ratio may also be used.

The amount of the polymerization initiator that the polymerizable liquid crystal composition contains is usually 1 part by weight or more and is usually 10 parts by weight or less and preferably 5 parts by weight or less, based on 100 parts by weight of the total amount of monomers.

When a photo-polymerization initiator is used, irradiation with light is performed for initiating a polymerization reaction. It is preferable to use ultraviolet light as the irradiation light. The energy of irradiation is preferably 0.1 mJ/cm$^2$ or more and is preferably 50 J/cm$^2$ or less and more preferably 800 mJ/cm$^2$ or less. No particular limitation is imposed on the method for ultraviolet light irradiation. The ultraviolet irradiation energy is appropriately selected in accordance with the type of polymerizable liquid crystal compound.

(Chiral Agent)

As the chiral agent to be added to the polymerizable liquid crystal composition, any of those described in Japanese Patent Application Laid-Open Nos. 2003-66214 A and 2003-313187 A, U.S. Pat. No. 6,468,444, and a pamphlet of International Publication No. 98/00428 may be appropriately used. Of these, a chiral agent having large HTP that is an index representing the efficiency of twisting the liquid crystal compound is preferred from the viewpoint of economical efficiency. The chiral agent may or may not exhibit liquid crystallinity, so long as a liquid crystal layer having the desired cholesteric regularity can be formed. As to the chiral agent, one species thereof may be solely used, and a combination of two or more species thereof in any ratio may also be used.

The amount of the chiral agent that the polymerizable liquid crystal composition contains is usually 0.01 parts by weight or more, preferably 0.1 parts by weight or more, and more preferably 0.5 parts by weight or more and is usually 35 parts by weight or less, preferably 25 parts by weight or less, and, more preferably 15 parts by weight or less, based on 100 parts by weight of the polymerizable liquid crystal compound being a liquid crystal compound. By setting the amount of the chiral agent to the aforementioned range, a liquid crystal layer having cholesteric regularity can be formed without reduction in liquid crystallinity.

(Surfactant)

If necessary, the polymerizable liquid crystal composition may contain a surfactant. The surfactant is used for controlling the surface tension of the coating layer of the polymerizable liquid crystal composition. The surfactant is preferably a nonionic surfactant and preferably an oligomer having a molecular weight of about several thousands. As to the surfactant, one species thereof may be solely used, and a combination of two or more species thereof in any ratio may also be used.

The amount of the surfactant that the polymerizable liquid crystal composition contains is usually 0.01 parts by weight or more, preferably 0.03 parts by weight or more, and more preferably 0.05 parts by weight or more and is usually 10 parts by weight or less, preferably 5 parts by weight or less, and more preferably 1 part by weight or less, based on 100 parts by weight of the polymerizable liquid crystal compound being a liquid crystal compound. By setting the amount of the surfactant to the aforementioned range, a liquid crystal layer having cholesteric regularity with no orientation defects can be formed.

(Solvent)

Examples of the solvent used for the polymerizable liquid crystal composition may include organic solvents such as ketones, alkyl halides, amides, sulfoxides, heterocycle compounds, hydrocarbons, esters, and ethers. Of these, ketones are preferred in consideration of environmental loads. As to the solvent, one species thereof may be solely used, and a combination of two or more species thereof in any ratio may also be used.

The amount of the solvent that the polymerizable liquid crystal composition contains is usually 40 parts by weight or more, preferably 60 parts by weight or more, and more preferably 80 parts by weight or more and is usually 1,000 parts by weight or less, preferably 800 parts by weight or less, and more preferably 600 parts by weight or less, based on 100 parts by weight of the polymerizable liquid crystal compound being a liquid crystal compound. By setting the amount of the solvent to the aforementioned range, coating can be performed uniformly without coating unevenness.

(Formation of Polymerizable Liquid Crystal Composition Film)

In the method (b), the prepared polymerizable liquid crystal composition is applied onto a substrate to be in a form of film and then dried to obtain a coating layer. The substrate, coating method, and drying method for the method (b) may be the same as those in the method (a).

(Polymerization and Control of Cholesteric Regularity)

In the method (b), the controlled cholesteric resin layer is obtained by polymerizing the polymerizable compounds such as the polymerizable liquid crystal compound and the additional copolymerizable monomer in the coating layer obtained by application and drying of the polymerizable liquid crystal composition and then controlling the cholesteric regularity of the coating layer. Preferably, the polymerization and the control of the cholesteric regularity are performed as in the method disclosed in International Publication No. 2008/007782.

That is, the controlled cholesteric resin layer may be formed by performing: the step of coating a substrate with the polymerizable liquid crystal composition containing the photo-polymerization initiator as a polymerization initiator to form a film and then drying the film, to form a photo-polymerizable coating layer (a coating layer formation step (I)); the step of irradiating the obtained coating layer with selective ultraviolet light (also referred to as band-broadening ultraviolet light) to polymerize the polymerizable liquid crystal composition (a selective ultraviolet irradiation step (II)); the step of changing the period of the cholesteric regularity of the coating layer (a cholesteric regularity-controlling step (III)); and the step of curing the coating layer (a coating layer-curing step (IV)). Preferably, in this procedure, the selective ultraviolet irradiation step (II) and the cholesteric regularity-controlling step (III) are repeated a plurality of times.

In the selective ultraviolet irradiation step (II), the coating layer is irradiated with selective ultraviolet light. The temperature during irradiation with selective ultraviolet light is usually 20° C. to 40° C. The integrated light amount of the selective ultraviolet light for irradiation is usually 0.5 mJ/cm$^2$ or more and less than 50 mJ/cm$^2$. The integrated light amount is measured on the surface of the substrate using a photometer having a peak sensitivity at the wavelength of the selective ultraviolet light (more specifically, having a peak sensitivity at, e.g., 360 nm).

Since the coating layer is a photo-polymerizable coating layer formed using the polymerizable liquid crystal composition containing the photo-polymerization initiator, the irradiation with selective ultraviolet light allows a polymerization reaction or a cross-linking reaction to proceed in the coating layer.

The selective ultraviolet light means ultraviolet light with its wavelength range or illuminance selectively controlled such that the degree of cross-linking (or the degree of polymerization) of the polymerizable liquid crystal compound in the aforementioned photo-polymerizable coating layer can be changed in the direction of the thickness of the coating layer. The irradiation with the selective ultraviolet light does not cause complete curing (100% polymerization) of the photo-polymerizable coating layer.

The irradiation with the selective ultraviolet light allows the degree of cross-linking of the liquid crystal in the coating layer to be changed in the direction of the thickness of the coating layer, so that the cholesteric regularity can be easily controlled such that the layer has a band of reflecting 40% or more of incident light with a bandwidth of 200 nm or wider.

Preferably, ultraviolet light having a width of a wavelength range of 100 nm or narrower is used as the selective ultraviolet light used in the selective ultraviolet irradiation step (II). More specifically, ultraviolet light having only wavelengths of 300 nm or longer and shorter than 400 nm is preferably used.

As the light source, a mercury lamp light source or a metal halide lamp light source may be used.

In this manner, in the selective ultraviolet irradiation step (II), it is preferable that the width of the wavelength range of the ultraviolet light is controlled to 100 nm or narrower using, e.g., a band-pass filter, and the resultant ultraviolet light is applied under the irradiation conditions of 0.5 mJ/cm$^2$ or more, and less than 50 mJ/cm$^2$. Under certain conditions, ultraviolet light can be used without controlling the width of the wavelength range. The width of the wavelength range is a half-width (the width at the value that is one half of the peak value of transmittance).

Examples of the method for controlling the wavelength range may include a method in which a band-pass filter with a center wavelength of 365 nm is used and a method in which the width of the wavelength range is set to 100 nm or narrower with the center at the wavelength of maximum absorption by the polymerization initiator contained in the coating layer.

The selective ultraviolet light may be applied from the coating layer side, from the substrate side, or from both the coating layer side and the substrate side. Preferably, from the viewpoint of reducing the inhibition of polymerization by oxygen, the selective ultraviolet light is applied from the substrate side. When the selective ultraviolet light is applied from the coating layer side, the stability of illuminance and irradiation time is controlled more accurately (usually within ±3%). Therefore, also from the viewpoint of productivity, it is preferable to apply the selective ultraviolet light from the substrate side.

When the selective ultraviolet light is applied from the substrate side, it is preferable that, before the selective ultraviolet irradiation step (II), a step of cooling the coating layer on the substrate is performed so that the temperature of the coating layer becomes 20° C. to 40° C. By applying the selective ultraviolet light to the coating layer maintained at 20° C. to 40° C., the light intensity is distributed in the direction of the thickness of the coating layer, and therefore a cholesteric resin layer with the degree of cross-linking varying in the direction of the thickness of the coating layer can be formed. Examples of the method for cooling the coating layer may include cooling by supplying cool air and cooling using a cooling roller.

After the selective ultraviolet irradiation step (II), the cholesteric regularity-controlling step (III) of changing the period of the cholesteric regularity of the coating layer is performed. The phrase "changing the period of the cholesteric regularity of the coating layer" means that the pitch of the cholesteric resin layer having cholesteric regularity is changed in the thickness direction.

Examples of the method for changing the period of the cholesteric regularity may include (i) a method in which the coating layer is subjected to heat treatment at a temperature equal to or higher than the temperature at which a liquid crystal phase appears, (ii) a method in which the liquid crystal compound is further applied to the coating layer, and (iii) a method in which a non-liquid crystal compound is further applied to the coating layer. One of these methods may be performed only once or may be repeated two times or more. Alternatively, a combination of two or more methods may be performed.

Among the methods (i) to (iii), the method (i) is preferred because of its simple procedure and efficiency. Considering productivity and the effectiveness of band broadening, the heat treatment conditions in the method (i) are usually a temperature of 50° C. to 115° C. for 0.001 minutes to 20 minutes, preferably a temperature of 65° C. to 115° C. for 0.001 minutes to 10 minutes, and more preferably a temperature of 65° C. to 115° C. for 0.01 minutes to 5 minutes.

However, since the temperature range in which a liquid crystal phase appears varies depending on the type of the liquid crystal compound forming the coating layer, the treatment temperature and the treatment time vary accordingly.

Preferably, the aforementioned selective ultraviolet irradiation step (II) and cholesteric regularity-controlling step (III) are repeated a plurality of times. By repeating these steps a plurality of times, the pitch of the chiral structure of the cholesteric resin layer can be largely changed. The conditions for irradiation with the selective ultraviolet light and for the control of the cholesteric regularity are appropriately adjusted each time to control the reflection band. No limitation is imposed on the number of repetitions, but the number of repetitions is preferably 2 or larger and 4 or smaller, from the view point of productivity and a facility. If the number of repetitions is 5 or larger, a large scale facility is required, and this may cause a reduction in productivity.

The term "repetition" of the selective ultraviolet irradiation step (II) and cholesteric regularity-controlling step (III) means that a sequence including the execution of the selective ultraviolet irradiation step (II) and the subsequent execution of the cholesteric regularity-controlling step (III) is repeated. That is, when the selective ultraviolet irradiation step (II) and the cholesteric regularity-controlling step (III) are repeated twice, the steps (II)-(III)-(II)-(III) are performed in this order. Another step such as the aforementioned cooling step may be performed between these steps.

Subsequently, the coating layer is cured (the coating layer-curing step (IV)). No particular limitation is imposed on the curing method, so long as the coating layer is cured to have cholesteric regularity. A preferable method is irradiation with main curing ultraviolet light at an integrated light amount of 10 mJ/cm$^2$ or more. The main curing ultraviolet light means ultraviolet light with its wavelength range or illuminance being set such that the coating layer can be completely cured.

The integrated light amount of the main curing ultraviolet light is preferably 10 mJ/cm$^2$ or more and more preferably 50 mJ/cm$^2$ or more and is preferably 1,000 mJ/cm$^2$ or less and more preferably 800 mJ/cm$^2$ or less. The integrated light amount is measured on the surface of the substrate using a ultraviolet meter. Alternatively, the illuminance is measured using a photometer, and the integrated light amount is calculated by multiplying the illuminance by time.

The main curing ultraviolet light may be applied from the coating layer side or the substrate side. However, it is preferable to apply the main curing ultraviolet light from the coating layer side because high irradiation efficiency is achieved.

Preferably, the irradiation with the main curing ultraviolet light is performed in an atmosphere containing low amount of oxygen gas, such as a nitrogen atmosphere. By performing the irradiation in such an atmosphere, inhibitory influence against polymerization by oxygen can be reduced. The concentration of oxygen gas during irradiation with the main curing ultraviolet light by weight ratio is preferably 3% or smaller, more preferably 1% or smaller, and particularly preferably 500 ppm or smaller.

Before the coating layer-curing step (IV), it is preferable to perform the step of cooling the coating layer on the substrate to 20° C. to 40° C. By performing irradiation with the aforementioned main curing ultraviolet light to the coating layer whose temperature is maintained at 20° C. to 40° C., the pitch of the cholesteric resin layer having cholesteric regularity after the cholesteric regularity-controlling step (III) can be maintained.

The coating layer-curing step (IV) allows the mechanical properties of the cholesteric resin layer having cholesteric regularity to be improved with its band broadening being maintained. A controlled cholesteric resin layer is thereby obtained.

As the layer forming system preferable for the aforementioned method for producing the controlled cholesteric resin layer, any known system may be used. An example of such a system may be a coating layer forming system including: a feed unit for continuously feeding a substrate; a coating head for coating the substrate fed from the feed unit with a liquid crystal composition to form, a coating layer; and two or more sequences each including cooling unit for cooling the substrate having the coating layer formed thereon, a selective ultraviolet irradiation unit and a main curing ultraviolet irradiation unit for irradiating the coating layer with the selective ultraviolet light with its wavelength range and/or illuminance selected and the main curing ultraviolet light, and means for heating the substrate. No particular limitation is imposed on the feed unit and coating head of such a coating layer forming system, and any known unit and head may be used.

The cooling unit for use in the coating layer forming system may be composed of, e.g., a cooling zone unit or a cooling roller and is preferably composed of a cooling zone unit. The cooling unit may be a device that surrounds a part of a convey path for the substrate and maintains the temperature inside the surrounded part at a constant temperature suitable for the curing of the liquid crystal composition. Preferably, all of the cooling units are disposed upstream of each of the selective ultraviolet irradiation unit and the main curing ultraviolet irradiation unit. More preferably, the cooling units are disposed immediately upstream of each of the selective ultraviolet irradiation unit and the main curing ultraviolet irradiation unit.

[1.2. ½ Wavelength Layer]

The heat insulating particulate pigment of the present invention may include a layer that has a phase difference of ½ wavelength of the band in which the controlled cholesteric resin layer reflects 40% or more of incident light (this layer is hereinafter appropriately referred to as a "½ wavelength layer"). Particularly, it is preferable that the heat insulating particulate pigment of the present invention includes two or more controlled cholesteric resin layers and also includes a ½ wavelength layer disposed between the two controlled cholesteric resin layers. This is because the reflection ratio of the heat insulating particulate pigment in the selective reflection band is thereby increased. For example, a ½ wavelength layer may be disposed between two controlled cholesteric resin layers having the same screw direction, whereby the direction of the circular polarization of transmitted light that has passed through one of the controlled cholesteric resin layers can be reversed by the ½ wavelength layer, so that the transmitted light can be reflected by the other controlled cholesteric resin layer. Therefore, the overall reflection ratio of the heat insulating particulate pigment of the present invention can be increased. The aforementioned reflection ratio of one controlled cholesteric resin layer in the selective reflection band is 50% at the maximum. However, with the aforementioned configuration, the overall reflection ratio of the heat insulating particulate pigment of the present invention can be 50% or more.

Let Re be the phase difference in a front direction of the ½ wavelength layer measured at the center wavelength $\lambda_c$ of the band in which the controlled cholesteric resin layer reflects 40% or more of incident light. Then the value obtained by dividing Re by the center wavelength $\lambda_c$ (Re/$\lambda_c$) is preferably 0.40 or more and more preferably 0.45 of more and is preferably 0.60 or less and more preferably 0.55 or less.

The phase difference Re in the front direction is a value represented by formula I: Re=(nx−ny)×d (wherein nx represents a refractive index in a direction perpendicular to a thickness direction (in-plane direction) and giving the maximum refractive index, ny represents a refractive index in a direction perpendicular to the thickness direction (in-plane direction) and orthogonal to the direction for nx, and d represents the thickness). The phase difference Re in the front direction may be measured using a commercially available phase difference measurement apparatus (for example, "KOBRA-21ADH," a product of Oji Scientific Instruments).

A layer formed of a resin is usually used as the ½ wavelength layer. Specific examples of the ½ wavelength layer may include a layer composed of a film obtained by stretching a transparent resin. The film obtained by stretching a transparent resin may be obtained by stretching an unstretched film formed of the transparent resin. Usually, such a film has a slow axis in a direction 15°±7° or −15°±7° from the width direction.

As the transparent resin, a resin having a total light transmittance of 80% or more at a thickness of 1 mm may be used. Examples of the polymer contained in the resin may include acetate-based polymers such as triacetylcellulose, polyester-based polymers, polyether sulfone-based polymers, polycarbonate-based polymers, chain polyolefin-based polymers, polymers having an alicyclic structure, acrylic-based polymers, polyvinyl alcohol-based polymers, and polyvinyl chloride-based polymers. Of these, polycarbonate-based polymers and polymers having an alicyclic structure are preferred. As to the polymer, one species thereof may be solely used, and a combination of two or more species thereof in any ratio may also be used.

If necessary, the transparent resin may contain additives such as an antioxidant, a thermal stabilizer, a photostabilizer, a ultraviolet absorber, an antistatic agent, a dispersant, a chlorine scavenging agent, a flame retardant, a nucleating agent, an anti-blocking agent, an anti-fogging agent, a release agent, a pigment, an organic or inorganic filler, a neutralizing agent, a slip additive, a decomposer, a metal inactivating agent, an antifouling material, an antibacterial agent, and a thermoplastic elastomer in an amount within the range in which the effects of the present invention are not impaired. The amount of such additives is usually 0 to 5 parts by weight and preferably 0 to 3 parts by weight, based on 100 parts by weight of the transparent resin.

The ½ wavelength layer composed of a stretched transparent resin film may be obtained by stretching an unstretched film formed of the transparent resin with its stretch ratio being adjusted. As the method for obtaining an unstretched film formed of a transparent resin, any of the known molding methods such as heat melt molding methods, e.g., melt extrusion molding, press molding, and inflation, and a solution casting method may be used. The molding conditions may be appropriately adjusted in accordance with the glass transition temperature of the transparent resin to be used, the solvent to be used, etc.

The thickness of the ½ wavelength layer composed of a stretched transparent resin film is usually 10 μm or more and preferably 30 μm or more and is usually 300 μm or less and preferably 200 μm or less.

As the ½ wavelength layer, a layer obtained by fixation of an oriented liquid crystal layer may also be used. No particular limitation is imposed on the ½ wavelength layer obtained by fixation of an oriented liquid crystal layer, so long as the oriented liquid crystal layer remains fixed under the conditions for use of the heat insulating particulate pigment of the present invention. For example, a liquid crystal polymer may be obtained by orientation at high temperature and subsequent fixation by quenching to low temperature, or by orientation treatment of a polymerizable liquid crystal compound and subsequent fixation by thermal and/or photo curing.

As the liquid crystal polymer and the polymerizable liquid crystal compound, a rod-shaped liquid crystal compound that exhibits a nematic phase or a smectic phase may be suitably used. More preferably, a rod-shaped liquid crystal compound that exhibits a nematic phase may be used. The thickness d of the ½ wavelength layer obtained by fixation of an oriented liquid crystal layer is given by $d=Re/\Delta n$, wherein Re is the desired phase difference and $\Delta n$ is the refractive index anisotropy of the liquid crystal compound used. For example, the ½ wavelength in a near infrared range at wavelengths of 900 nm to 1,300 nm is 450 nm to 650 nm. When a rod-shaped liquid crystal compound having a $\Delta n$ of 0.14 is used, a ½ wavelength layer with an Re of 560 nm may be formed by setting the thickness to 4 μm. Preferably, the polymerizable liquid crystal compound is a polyfunctional compound. By cross-linking such a compound during curing, a high-heat resistant ½ wavelength layer can be obtained.

The ½ wavelength layer may be stacked on the controlled cholesterin: resin layer directly or through a sticky bonding agent layer or a adhesive bonding agent layer, an orientation film, etc.

[1.3. Sticky Bonding Agent Layer or Adhesive Bonding Agent Layer]

The heat insulating particulate pigment of the present invention may include a sticky bonding agent layer or a adhesive bonding agent layer. The sticky bonding agent layer and the adhesive bonding agent layer are a layer formed of a sticky bonding agent or a adhesive bonding agent for attaching layers that are the components of the heat insulating particulate pigment of the present invention. No particular limitation is imposed on the sticky bonding agent and the adhesive bonding agent for forming a sticky bonding agent layer and a adhesive bonding agent layer, so long as the sticky bonding agent and the adhesive bonding agent are transparent. Examples of such a sticky bonding agent and a adhesive bonding agent may include thermoplastic resin type adhesives and thermosetting resin type adhesives.

Examples of the sticky bonding agent and the adhesive bonding agent of thermoplastic resin type may include vinyl acetate type, polyvinyl alcohol type, polyvinyl acetal type, vinyl chloride type, acrylic type, polyamide type, polyethylene type, and cellulose type agents. Of these, sticky bonding agent and adhesive bonding agent of acrylic type are preferred. Examples of preferable main component of the sticky bonding agent and the adhesive bonding agent of acrylic type may include copolymers of ethyl acrylate, butyl acrylate, 2-ethylhexyl acrylate, etc. with methacrylate, styrene, acrylonitrile, vinyl acetate, etc.

Examples of the sticky bonding agent and the adhesive bonding agent of thermosetting resin type may include melamine type, phenol type, resorcinol type, polyester type, polyurethane type, epoxy type, and polyaromatic type agents. Of these, sticky bonding agent and adhesive bonding agent of polyurethane type and epoxy type are preferred. The sticky bonding agent and the adhesive bonding agent of polyurethane type contain, as a main component, a polymer obtained by reacting isocyanate with an excess amount of alcohol and is suitably used as a hot melt agent or a solvent-soluble type agent. The sticky bonding agent and the adhesive bonding agent of polyurethane type are easily cured at room temperature or under heating using a curing agent such as an amine curing agent.

As to the sticky bonding agent and the adhesive bonding agent, one species thereof may be solely used, and a combination of two or more species thereof in any ratio may also be used.

The form of use of the sticky bonding agent and the adhesive bonding agent may be a film, an aqueous solution, or an emulsion.

The thickness of the sticky bonding agent layer and adhesive bonding agent layer is usually 1 μm or more, preferably 1.5 μm or more, and more preferably 2 μm or more and is usually 50 μm or less, preferably 30 μm or less, and more preferably 20 μm or less.

[1.4. Orientation Film]

The heat insulating particulate pigment of the present invention may include an orientation film. This orientation film is the orientation film that had been used for forming the controlled cholesteric resin layer or the ½ wavelength layer and remains in the heat insulating particulate pigment of the present invention. The orientation film for producing the controlled cholesteric resin layer has already been described. Therefore, the orientation film for forming the ½ wavelength layer will be described hereinbelow.

This orientation film is used when the ½ wavelength layer is produced by fixation of an oriented liquid crystal layer. For example, the orientation film is provided when a liquid crystal layer that has a phase difference of ½ wavelength is formed on the controlled cholesteric resin layer, for the purpose of improving orientation and improving the adhesion between the controlled cholesteric resin layer and the ½ wavelength layer. The material for the orientation film may be any known material such as those containing a polymer such as polyimide, polyvinyl alcohol, polyester, polyarylate, polyamide imide, polyamide, or polyether imide. As to the material for the orientation film, one species thereof may be solely used, and a combination of two or more species thereof in any ratio may also be used.

The orientation film may be obtained by applying a solution containing the aforementioned polymer onto a substrate such as the controlled cholesteric resin layer to form a film, drying the film, and subjecting the film to, e.g., rubbing treatment in one direction.

The thickness of the orientation film is usually 0.01 μm or more and preferably 0.0.5 μm or more and is usually 5 μm or less and preferably 1 μm or less.

[1.5. Other Layers]

The heat insulating particulate pigment of the present invention may include layers other than the aforementioned layers, so long as the effects of the present invention are not significantly impaired. For example, the heat insulating particulate pigment of the present invention may include a cholesteric resin layer other than the aforementioned controlled cholesteric resin layer. For example, substrates that had been used for producing the controlled cholesteric resin layer, the ½ wavelength layer, etc. may remain in the heat insulating particulate pigment of the present invention.

[1.6. Examples of Layer Structure]

Examples of the layer structure of the heat insulating particulate pigment of the present invention will be described hereinbelow. FIGS. 1 to 6 are schematic cross-sectional views illustrating the layer structures of the heat insulating particulate pigments of the present invention.

As shown in, e.g., FIG. 1, a heat insulating particulate pigment 10A of the present invention may be particles having a single layer structure including only one controlled cholesteric resin layer 1. With the heat insulating particulate pigment 10A, 40% or more of incident light in a band with a width of 200 nm or wider within the wavelength range of 800 nm to 1,900 nm can be reflected.

Figure 2:
FIG. 2 is a schematic cross-sectional view illustrating the layer structure of a heat insulating particulate pigment of the present invention.

As shown in, e.g., FIG. 2, a heat insulating particulate pigment 10B of the present invention may be particles having a stacked structure including controlled cholesteric resin layers 1a and 1b of the same twist type, i.e., with the same twist direction of molecular axes. Also with the heat insulating particulate pigment 10B, 40% or more of incident light in a band with a width of 200 nm or wider within the wavelength range of 800 nm to 1,900 nm can be reflected. Since a combination of two controlled cholesteric resin layers 1a and 1b is used in the heat insulating particulate pigment 10B, the total width of the band reflecting 40% or more of incident light can be wider than that of the heat insulating particulate pigment 10A having a single layer structure, and 40% or more of incident light can be reflected even in a wavelength range wider than the range of 800 nm to 1,900 nm (for example, in the wavelength range of 750 nm to 2,000 nm).

Figure 3:
FIG. 3 is a schematic cross-sectional view illustrating the layer structure of a heat insulating particulate pigment of the present invention.

As shown in, e.g., FIG. 3, a heat insulating particulate pigment 10C of the present invention may be particles having a stacked structure including a controlled cholesteric resin layer 1c of the type in which molecular axes are twisted in a clockwise direction and a controlled cholesteric resin layer 1d of the type in which molecular axes are twisted in an anticlockwise direction. Also with the heat insulating particulate pigment 10C, 40% or more of incident light in a band with a width of 200 nm or wider within the wavelength range of 800 nm to 1,900 nm can be reflected. In addition, in the heat insulating particulate pigment 10C, since a combination of two types of controlled cholesteric resin layers 1c and 1d with different twist directions of molecular axes is used, both right circularly polarized light and left circularly polarized light can be reflected. Therefore, the total width of the band reflecting 40% or more of incident light can be wider than that of the heat insulating particulate pigment 10A having a single layer structure, and 40% or more of incident light can be reflected even in a wavelength range wider than the range of 800 nm to 1,900 nm (for example, in the wavelength range of 750 nm to 2,000 nm). Moreover, it is possible to realize the incident light reflection ratio of 50% or more.

Figure 4:
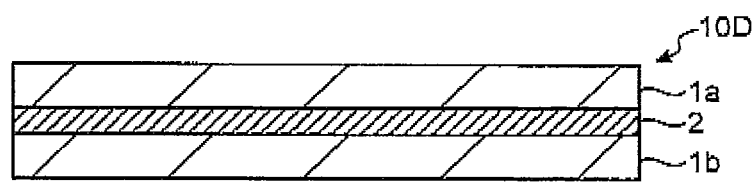
FIG. 4 is a schematic cross-sectional view illustrating the layer structure of a heat insulating particulate pigment of the present invention.

As shown in, e.g., FIG. 4, a heat insulating particulate pigment 10D of the present invention may be particles having a stacked structure including two controlled cholesteric resin layers 1a and 1b of the same twist type and a ½ wavelength layer 2 disposed between these controlled cholesteric resin layers 1a and 1b. In the heat insulating particulate pigment 10D, incident light passes through the controlled cholesteric resin layer 1a, the ½ wavelength layer 2, and the controlled cholesteric resin layer 1b in this order or reverse order. Therefore, the direction of the circular polarization of circularly polarized light that has passed through one of the controlled cholesteric resin layers 1a and 1b is reversed by the ½ wavelength layer 2, and the resulting circularly polarized light enters the other one of the controlled cholesteric resin layers 1a and 1b. Accordingly, the heat insulating particulate pigment 10D can have the same effects as those of the heat insulating particulate pigment 10C.

Figure 5:
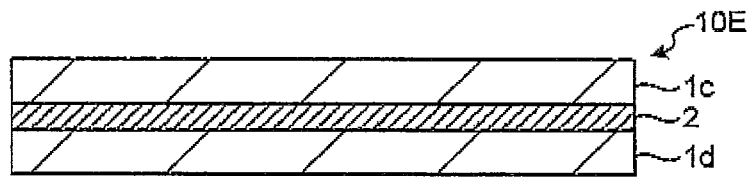
FIG. 5 is a schematic cross-sectional view illustrating the layer structure of a heat insulating particulate pigment of the present invention.

As shown in, e.g., FIG. 5, a heat insulating particulate pigment 10E of the present invention may be particles having a stacked structure including two controlled cholesteric resin layers 1c and 1d of the same twist type and a ½ wavelength layer 2 disposed between the controlled cholesteric resin layers 1c and 1d. In this heat insulating particulate pigment 10E, the direction of the circular polarization of circularly polarized light that has passed through one of the controlled cholesteric resin layers 1c and 1d is reversed by the ½ wavelength layer 2, and the resulting circularly polarized light enters the other one of the controlled cholesteric resin layers 1c and 1d. Therefore, the heat insulating particulate pigment 10E can have the same effects as those of the heat insulating particulate pigment 10B.

Figure 6:
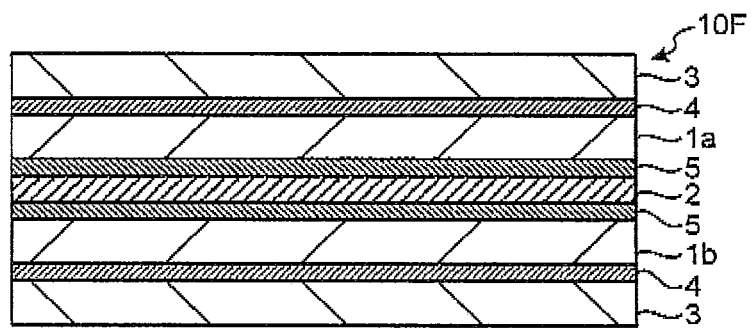
FIG. 6 is a schematic cross-sectional view illustrating the layer structure of a heat insulating particulate pigment of the present invention.

As shown in, e.g., FIG. 6, a heat insulating particulate pigment 10F of the present invention may be particles having a stacked structure including a substrate 3, an orientation film 4, a controlled cholesteric resin layer 1a, a sticky bonding agent layer 5, a ½ wavelength layer 2, a sticky bonding agent layer 5, a controlled cholesteric resin layer 1b, an orientation film 4, and a substrate 3 in this order. When the substrates 3, the orientation films 4, and the sticky bonding agent layers 5 are provided in the heat insulating particulate pigment 10F in this manner, 40% or more of incident light in a band having a width of 200 nm or wider within the wavelength range of 800 nm to 1,900 nm can be reflected. The heat insulating particulate pigment 10F can have the same effects as those of the heat insulating particulate pigment 10D.

The heat insulating particulate pigments having the layer structures exemplified in the above may further be modified. For example, in the heat insulating particulate pigment 10B shown in FIG. 2, a sticky bonding agent layer may be provided between the controlled cholesteric resin layer 1a and the controlled cholesteric resin layer 1b. For example, in the heat insulating particulate pigment 10C shown in FIG. 3, a sticky bonding agent layer may be provided between the controlled cholesteric resin layer 1c and the controlled cholesteric resin layer 1d. For example, in the heat insulating particulate pigment 10D shown in FIG. 4, a sticky bonding agent layer may be provided between the controlled cholesteric resin layer 1a and the ½ wavelength layer 2, and a sticky bonding agent layer may be provided between the controlled cholesteric resin layer 1b and the ½ wavelength layer 2. For example, in the heat insulating particulate pigment 10E shown in FIG. 5, a sticky bonding agent layer may be provided between the controlled cholesteric resin layer 1c and the ½ wavelength layer 2, and a sticky bonding agent layer may be provided between the controlled cholesteric resin layer 1d and the ½ wavelength layer 2.

[1.7. Shape and Particle Diameter of Heat Insulating Particulate Pigment]

No limitation is imposed on the shape of the heat insulating particulate pigment of the present invention. However, the heat insulating particulate pigment is usually in a flake form (form of thin pieces).

The median volumetric diameter of the heat insulating particulate pigment of the present invention is usually 5 μm or larger, preferably 8 μm or larger, and more preferably 10 μm or larger and is usually 200 μm or smaller, preferably 100 μm or smaller, and more preferably 80 μm or smaller. When the mean particle diameter falls within the aforementioned range, the excellent reflection characteristics of the controlled cholesteric resin layer included in the heat insulating particulate pigment of the present invention can be effectively utilized.

The median volumetric diameter of the heat insulating particulate pigment can be measured using, e.g., a laser diffraction-scattering type particle size distribution measurement apparatus.

[1.8. Properties of Heat Insulating Particulate Pigment]

Since the heat insulating particulate pigment of the present invention includes a controlled cholesteric resin layer as described above, high energy infrared radiation in the wavelength range of 800 nm to 1,900 nm can be efficiently reflected. Therefore, the heat insulating particulate pigment of the present invention has high heat insulating properties. This can prevent infrared radiation from entering objects onto which the heat insulating particulate pigment of the present invention is applied, such as members containing the heat insulating particulate pigment and members coated with the heat insulating particulate pigment. Therefore, an increase in temperature of such objects by the energy of the infrared radiation can be significantly suppressed.

In the heat insulating particulate pigment of the present invention, the liquid crystal compound used in the controlled cholesteric resin layer usually has a large refractive index anisotropy Δn, and has no or only a small number of orientation defects, so that high transparency can be achieved. That is, light transmittance in the visible light range is high, and haze is small. Therefore, the heat insulating particulate pigment of the present invention can be applied to a wide variety of products without impairing the appearance of the products. The specific degree of the transparency of the heat insulating particulate pigment of the present invention may be set depending on an application purpose.

Since the heat insulating particulate pigment of the present invention includes a controlled cholesteric resin layer that is a layer of a cross-linked resin, bleeding is less likely to occur in the controlled cholesteric resin layer. In addition, since the pigment is designed not to absorb but to reflect infrared radiation, the temperature of the heat insulating particulate pigment itself is not increased by the absorption of the infrared radiation. Therefore, the heat insulating particulate pigment of the present invention is excellent in heat resistance and long-term reliability.

Because of the aforementioned good properties, the heat insulating particulate pigment of the present invention is applicable to a variety of applications. For example, the heat insulating particulate pigment may be used for coating solutions for window materials, buildings, vehicles, ships, airplanes, etc. and as additives for resin molded products.

[2. Method for Producing Heat Insulating Particulate Pigment]

No limitation is imposed on the method for producing the heat insulating particulate pigment of the present invention. However, the heat insulating particulate pigment of the present invention is usually produced by producing a sheet having the same layer structure as that of the heat insulating particulate pigment (hereinafter, the sheet is appropriately referred to as a "heat insulating sheet") and then pulverizing the heat insulating sheet. The method for producing the heat insulating particulate pigment will be described hereinbelow.

First, a heat insulating sheet is prepared. When a heat insulating sheet having a single layer structure including only one controlled cholesteric resin layer is produced, the controlled cholesteric resin layer is produced on a substrate, e.g., in the aforementioned manner, and then the produced controlled cholesteric resin layer is peeled off the substrate. When a heat insulating sheet having a stacked structure including at least a controlled cholesteric resin layer and other layers (another controlled cholesteric resin layer, a ½ wavelength layer, etc.) is produced, these layers may be formed by sequentially stacking them on a substrate, e.g., in the aforementioned manner. Alternatively, layers formed separately may be laminated using, if necessary, a sticky bonding agent or a adhesive bonding agent. A combination of these procedures may also be used. In these cases, the obtained heat insulating sheet is usually peeled off the substrate before pulverization. However, if necessary, the heat insulating sheet may be pulverized together with the substrate.

Since the prepared heat insulating sheet includes the controlled cholesteric resin layer, the sheet reflects usually 40% or more and preferably 60% or more of light in a band having a bandwidth of 200 nm or wider in the wavelength range of 800 nm to 1900 nm.

The thickness of the prepared heat insulating sheet is usually 3 μm or more, preferably 5 μm or more, and more preferably 7 μm or more and is usually 35 μm or less, preferably 30 μm or less, and more preferably 25 μm or less.

After the heat insulating sheet is prepared, the prepared heat insulating sheet is pulverized. Dry pulverization or wet pulverization may be performed. The pulverizer for use may be, e.g., an impact mill, a screen mill, a friction mill, or a freezing mill.

The heat insulating particulate pigment of the present invention is obtained by pulverizing the heat insulating sheet. If necessary, the obtained heat insulating particulate pigment may be washed with a suitable washing solution and may be subjected to classification to obtain the desired particle size.

[3. Infrared Reflective Coating Solution]

An infrared reflective coating solution of the present invention contains at least the heat insulating particulate pigment of the present invention. Therefore, when the infrared reflective coating solution of the present invention is applied onto a certain object, the object is coated with a coating layer containing the heat insulating particulate pigment of the present invention. Since the heat insulating particulate pigment of the present invention contained in the coating layer efficiently reflects infrared radiation as described above, the coating layer has high heat insulating properties. Therefore, the infrared reflective coating solution of the present invention can prevent infrared radiation from entering the object coated with the infrared coating solution of the present invention, and an increase in temperature of the coated object by the energy of the infrared radiation can be significantly suppressed.

The infrared reflective coating solution of the present invention contains at least the heat insulating particulate pigment of the present invention and usually further contains a solvent. In such an infrared reflective coating solution, the heat insulating particulate pigment of the present invention is usually dispersed in the solvent. Preferably, the infrared reflective coating solution of the present invention contains a polymer and/or a monomer as a binder component. When the coating solution contains a monomer, it is preferable that the coating solution further contain a polymerization initiator.

The solvent for use may be, e.g., an inorganic solvent such as water, but an organic solvent is usually used. Examples of the organic solvent may include ketones, alkyl halides, amides, sulfoxides, heterocycle compounds, hydrocarbons, esters, and ethers. Of these, ketones are preferred in consideration of environmental loads. As to the solvent, one species thereof may be solely used, and a combination of two or more species thereof in any ratio may also be used.

The amount of the solvent is usually 40 parts by weight or more, preferably 60 parts by weight or more, and more preferably 80 parts by weight or more and is usually 1,000 parts by weight or less, preferably 800 parts by weight or less, and more preferably 600 parts by weight or less, based on 100 parts by weight of the pigment solid content (usually the total amount of the heat insulating particulate pigment of the present invention and the binder component). By setting the amount of the solvent to the aforementioned range, the application properties of the infrared reflective coating solution of the present invention can be improved, and the density of the heat insulating particulate pigment present in the coating layer can be maintained at a high level, so that heat insulating properties can be improved.

The binder component is a component for holding the heat insulating particulate pigment of the present invention in the coating layer of the infrared reflective coating solution of the present invention. When the binder component is a polymer, examples thereof may include polyester-based polymers, acrylic-based polymers, polystyrene-based polymers, polyamide-based polymers, polyurethane-based polymers, polyolefin-based polymers, polycarbonate-based polymers, and polyvinyl-based polymers. When a monomer is used as the binder component, any monomer that is polymerized to give any of the aforementioned polymers may be used. The monomer may be a thermo-polymerizable monomer or a photo-polymerizable monomer. As to the binder component, one species thereof may be solely used, and a combination of two or more species thereof in any ratio may also be used.

From the viewpoint of improving the transparency of the coating layer of the infrared reflective coating solution of the present invention, it is preferable that the difference in refractive index between the heat insulating particulate pigment of the present invention and the binder component in the coating is small. More specifically, the difference in refractive index between the heat insulating particulate pigment of the present invention and the binder component (the polymer itself, if a polymer is used as the binder component; or the polymer resulting from polymerization of a monomer, if a monomer is used as the binder component) is preferably 0.15 or less, more preferably 0.10 or less, particularly preferably 0.05 or less, and ideally 0.00.

The amount of the binder component is usually 20 parts by weight or more, preferably 40 parts by weight or more, more preferably 60 parts by weight or more and is usually 1,000 parts by weight or less, preferably 800 parts by weight or less, and more preferably 600 parts by weight or less, based on 100 parts by weight of the heat insulating particulate pigment of the present invention. By setting the amount of the binder component to the aforementioned range, the application properties of the infrared reflective coating solution of the present invention can be improved, and the heat insulating particulate pigment can be held in the coating layer in a reliable manner.

When a monomer is contained as the binder component, it is preferable that the infrared reflective coating solution of the present invention further contain a polymerization initiator suitable for the monomer. Examples of the polymerization initiator may include those exemplified in the description of the controlled cholesteric resin layer. As the polymerization initiator, one species thereof may be solely used, and a combination of two or more species in any ratio may also be used.

The amount of the polymerization initiator is usually 0.5 parts by weight or more and preferably 1 part by weight or more and is usually 10 parts by weight or less and preferably 6 parts by weight or less, based on 100 parts by weight of the monomer.

The infrared reflective coating solution of the present invention may contain components other than the heat insulating particulate pigment of the present invention, the solvent, the binder component, and the polymerization initiator, so long as the effects of the present invention are not significantly impaired. Examples of such components may include an antioxidant, a ultraviolet absorber, a light stabilizer, and a bluing agent.

The infrared reflective coating solution of the present invention may be produced, e.g., by mixing the components to be contained in the infrared reflective coating solution of the present invention. The order of mixing etc. may be appropriately set depending on an application purpose, the properties of the components, etc. If necessary, stirring, ultrasonic dispersing treatment, etc. may be performed.

By applying the infrared reflective coating solution of the present invention onto an object to be coated and then removing the solvent from the coating layer, an infrared reflecting layer can be formed as the coating layer covering the object. When a monomer is used as the binder component, the monomer is polymerized after applying the solution by heat or light to cure the coating layer.

No limitation is imposed on the object to be coated. However, an object irradiated with sunlight is preferred from the viewpoint of the effective utilization of the ability to efficiently reflect infrared radiation. Examples of such an object may include window materials, the exterior walls of buildings, vehicles, ships, and airplanes. Particularly, it is preferable to apply the infrared reflective coating solution onto the inner side of laminated glass (for example, onto the inner glass surface with polyvinyl butyral (PVB) used as a binder), the outer side of glass, bodies of automobiles, and the outer walls of buildings. The use as a top coat for bodies of automobiles and for the outer walls of buildings is particularly preferred because the advantages of the present invention that an infrared reflecting layer can be easily formed can be effectively used.

No limitation is imposed on the method for applying the infrared reflective coating solution of the present invention. When the coating solution is applied onto a large area, spray coating, e.g., can be easily performed. No limitation is imposed either on the method for removing the solvent from the coating layer. Usually, the solvent is removed by drying.

The thickness of the infrared reflecting layer to be formed may be set depending on an application purpose but is usually 15 μm or more, preferably 25 μm or more, and more preferably 35 μm or more and is usually 200 μm or less, preferably 150 μm or less, and more preferably 100 μm or less.

The infrared reflecting layer is a layer including at least the heat insulating particulate pigment of the present invention. Since the infrared reflecting layer includes the heat insulating particulate pigment of the present invention, the infrared reflecting layer efficiently reflects infrared radiation in the wavelength range of 800 nm to 1,900 nm. Particularly, the infrared reflecting layer can reflect a large part of high energy infrared radiation in sunlight, i.e., in the wavelength range of about 900 nm to about 1,300 nm.

The infrared reflecting layer is a transparent layer that allows visible light to pass therethrough at a high transmittance. The specific transmittance for visible light may be set depending on its application purpose. For example, when the object to be coated is a window material for buildings, vehicles, ships, airplanes, etc., the mean transmittance for incident light in the wavelength range of 420 nm to 780 nm, i.e. the visible wavelength range, is set to usually 50% or more so that brightness is maintained in their interior. When the object to be coated is a window material for automobiles, the mean transmittance is preferably 60% or more and more preferably 70% or more to meet the restrictions of the Road Traffic Law.

The infrared reflecting layer does not absorb infrared radiation but reflects the infrared radiation. Therefore, in contrast to a coated product including an infrared absorption coating layer, accumulation of heat in the infrared reflecting layer is suppressed. Since the infrared reflecting layer has high transparency, it can be suitably used for preventing an increase in temperature of a black object that easily absorbs light and accumulates heat, without impairing its appearance.

Since the heat insulating particulate pigment of the present invention has high heat resistance and long-term reliability, the infrared reflecting layer also has high heat resistance and long-term reliability.

Since the infrared reflecting layer can be easily produced by applying the infrared reflective coating solution of the present invention onto an object to be coated and then removing the solvent, production with simple method and high productivity can be achieved and therefore highly practical.

Examples of the layer structure when an infrared reflecting layer is provided and a window material is used as an exemplary object to be coated will be described hereinbelow. FIGS. 7 to 10 are schematic cross-sectional views illustrating the layer structures of window materials on which infrared reflecting layers are provided. In the layer structures of the window materials exemplified below, no limitation is imposed on the heat insulating particulate pigment contained in the infrared reflecting layer, so long as it is any of the heat insulating particulate pigments of the present invention. For example, a heat insulating particulate pigment having any of the layer structures shown in FIGS. 1 to 6 may be used, and a heat insulating particulate pigment having a layer structure other than these layer structures may also be used.

Figure 7:
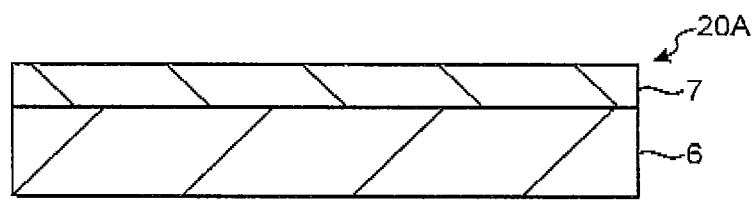
FIG. 7 is a schematic cross-sectional view illustrating the layer structure of a window material including an infrared reflecting layer.

As shown in, e.g., FIG. 7, a window material 20A may include only one infrared reflecting layer 7 provided on a transparent substrate 6. With the window material 20A, an excellent heat insulating effect of the infrared reflecting layer 7 can be obtained.

Figure 8:
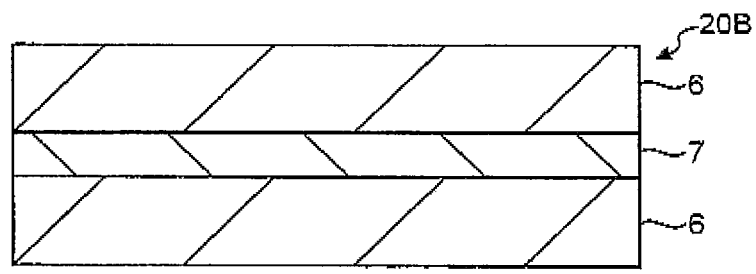
FIG. 8 is a schematic cross-sectional view illustrating the layer structure of a window material including an infrared reflecting layer.

As shown in, e.g., FIG. 8, a window material 20B may include an infrared reflecting layer 7 between two transparent substrates 6. This window material 20B can provide the same effect as that of the window material 20A. In addition, since two transparent substrates 6 are provided, the strength of the window material 20B itself can be increased.

Figure 9:
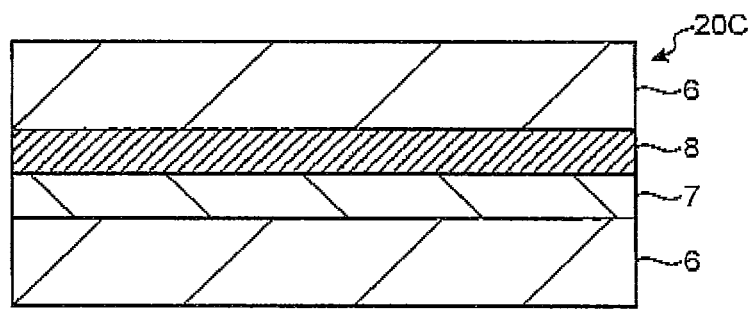
FIG. 9 is a schematic cross-sectional view illustrating the layer structure of a window material including an infrared reflecting layer.

As shown in, e.g., FIG. 9, a window material 20C may include an infrared reflecting layer 7 and an intermediate film 8 that are disposed between two transparent substrates 6. This window material 20C can provide the same effect as that of the window material 20B. In addition, since the intermediate film 8 is provided, shock resistance can be improved.

Figure 10:
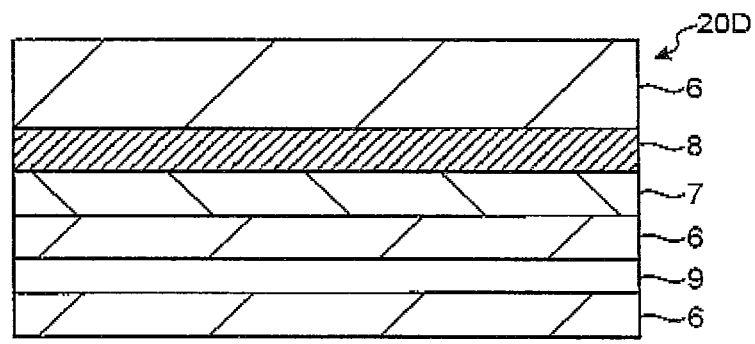
FIG. 10 is a schematic cross-sectional view illustrating the layer structure of a window material including an infrared reflecting layer.

As shown in, e.g., FIG. 10, a window material 20D may include an infrared reflecting layer 7 and an intermediate film 8 that are disposed between two transparent substrates 6 and further include another transparent substrate 6 disposed on the outer side of one of the two transparent substrates 6 through an air layer 9. The window material 20D can provide the same effect as that of the window material 20C. In addition, the air layer 9 can reduce the heat transfer properties of the window material 20D.

As in the window materials 20B to 20D, the use of an object to be coated having a multi-layer structure is preferred in terms of heat insulating properties and strength. Particularly, in an instance with laminated glass for window materials etc., it is preferable to dispose an infrared reflecting layer on the inner side of the laminated glass so that it is used as heat insulating glass. The laminated glass is glass with an intermediate film heat-sealed between two glass plates corresponding to transparent substrates or glass with an air layer provided between two glass plates. The intermediate film may be disposed such that layers constituting the infrared reflecting layer can be integrated with the glass.

Any known transparent resin may be used as the intermediate film. Examples of such a transparent resin may include polyvinyl butyral and ethylene-vinyl acetate copolymers. Of these, polyvinyl butyral is preferred. No particular limitation is imposed on the thickness of the intermediate film, so long as it does not cause problems in the performance of laminated glass and production suitability. The thickness of the intermediate film is, e.g., 0.1 mm to 2 mm.

EXAMPLES

The present invention will be specifically described hereinbelow by referring to Examples. However, the invention is not limited to the following Examples and may be arbitrarily modified for implementation without departing from the gist of the present invention and equivalents thereof. In the following description, Et represents an ethyl group.

Example 1

(1-1) Formation of Cholesteric Resin Layer A

A film formed of an alicyclic olefin polymer (product name: "ZEONOR FILM ZF16-100," a product of OPTES Inc.) was subjected to rubbing treatment, and the rubbed surface was coated, using a #20 wire bar, with a cholesteric liquid crystal composition prepared by mixing components shown in Table 1 in a ratio shown therein.

TABLE 1

| Composition of cholesteric liquid crystal composition | |
|---|---|
| | Parts by weight |
| Compound 1 | 24 |
| Compound 2 | 6 |
| Chiral agent | 1 |
| Polymerization initiator | 1.5 |
| Surfactant | 0.03 |
| cyclopentanone | 70 |

Details of the components shown in Table 1 are as follows.
i. Compound 1:
As compound 1, a polymerizable liquid crystal compound (refractive index anisotropy: $\Delta n=0.22$) having the following structure was used.

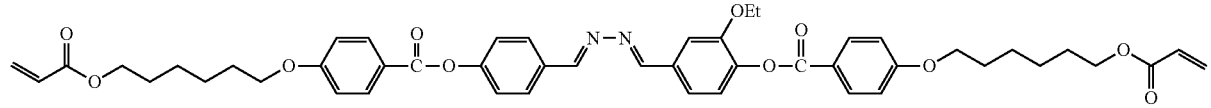

Compound 1 ii. Compound 2:
A polymerizable non-liquid crystal compound (refractive index anisotropy: $\Delta n=0.20$) having the following structure was used as compound 2.

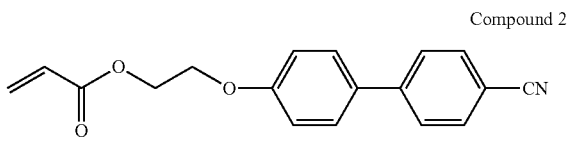 [SMILES: C=CC(=O)OCCOc1ccc(-c2ccc(C#N)cc2)cc1]

Compound 2 iii. Chiral Agent:
As a chiral agent, product name LC756 manufactured by BASF was used.

iv. Polymerization Initiator:

As a polymerization initiator, product name IRGACURE OXE02 manufactured by Ciba Japan K.K. was used.

v. Surfactant:

As a surfactant, a fluorine-based surfactant (product name: FTERGENT 209F) manufactured by NEOS Company Limited was used.

The coating layer was subjected to orientation treatment at 100° C. for 5 minutes. The resulting coating layer was subjected to a process consisting of irradiation treatment with weak ultraviolet light at 0.1 mJ/cm² to 45 mJ/cm² and subsequent heat treatment at 100° C. for 1 minute. This process was repeated twice. Then the resulting coating layer was irradiated with ultraviolet light at 2,000 mJ/cm² in a nitrogen atmosphere. A cholesteric resin layer A having a dry thickness of 10 μm was thereby formed on the film.

Figure 11:
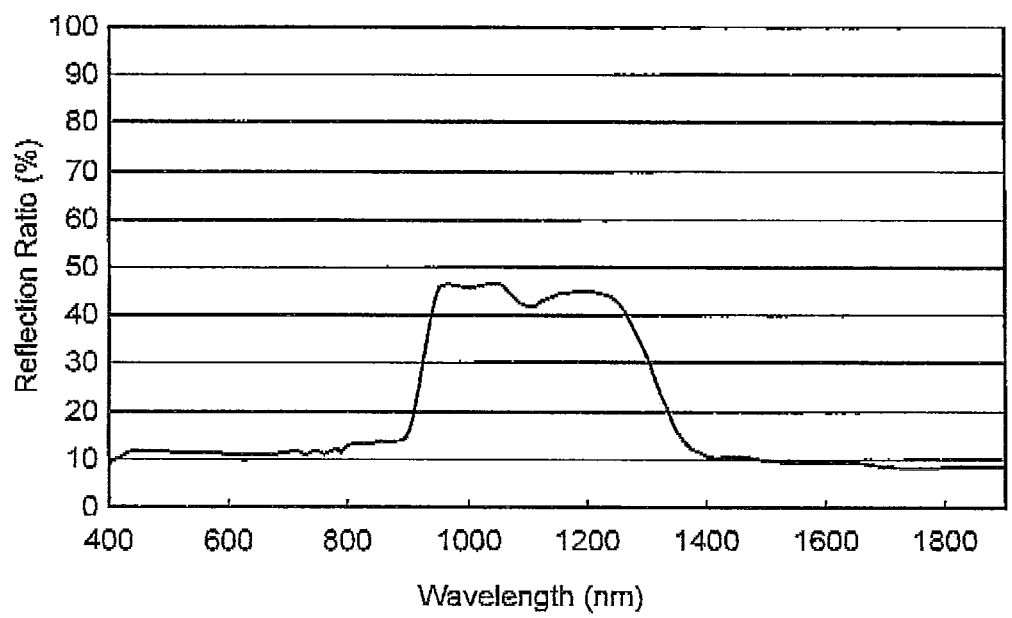
FIG. 11 is a graph showing the reflection spectrum of a cholesteric resin layer A measured in Example 1 of the present invention.

(1-2) Measurement of Light Transmittance and Reflection Ratio of Cholesteric Resin Layer A The transmission spectrum and reflection spectrum of the film having the cholesteric resin layer A formed in (1-1) was measured in the wavelength range of 420 nm to 1,900 nm using a ultraviolet-visible near infrared spectrophotometer type V-570 manufactured by JASCO Corporation, to examine the center wavelength of the reflection band and the bandwidth in which the reflection ratio was 40% or more. The obtained reflection spectrum is shown in FIG. 11, and the values of the results are shown in Table 4.

(1-3) Production of Heat Insulating Flakes A

From the film prepared in (1-1) on which the cholesteric resin layer had been formed, the cholesteric resin layer was peeled off, and then subjected to pulverization treatment for 10 minutes using a cryogenic sample crusher (JFC-300, a product of Japan Analytical Industry Co., Ltd.) at 1,450 rpm to obtain heat insulating flakes A as a heat insulating particulate pigment consisting of the cholesteric resin layer. The mean particle diameter of the heat insulating flakes A was measured using a laser diffraction-scattering particle size distribution measurement apparatus (MT3000II, a product of NIKKISO CO., LTD.) and was found to be 30 μm.

Example 2

(2-1) Formation of Infrared Reflecting Layer

Components shown in Table 2 were mixed in a ratio shown therein, and the mixture was subjected to dispersion treatment with ultrasonic waves to obtain an infrared reflective coating solution.

TABLE 2

Compositions of infrared reflective coating solutions

|  | Example 2 (parts by weight) | Example 4 (parts by weight) |
| --- | --- | --- |
| Heat insulating flakes A | 12 | — |
| Heat insulating flakes B | — | 8 |
| DPHA | 12 | 15 |
| HEA | 6 | 7 |
| Polymerization initiator | 0.6 | 0.7 |
| 2-Butanone | 70 | 70 |

Details of the components shown in Table 2 are as follows.

i. DPHA:

Dipentaerythritol hexaacrylate ii. HEA:

2-Hydroxyethyl acrylate iii. Polymerization Initiator:

Product name IRGACURE 907 manufactured by Ciba Japan K.K. was used as the polymerization initiator.

The surface of a 1.1 mm-thick glass plate (product name: "#1737," a product of Corning Incorporated) was subjected to corona treatment, and the corona-treated surface was spay-coated with the infrared reflective coating solution. The coating layer was dried at 100° C. for 1 minute and then irradiated with ultraviolet light at 1,000 mJ/cm² to produce glass having an infrared reflecting layer with a dry thickness of 60 μm.

Figure 12:
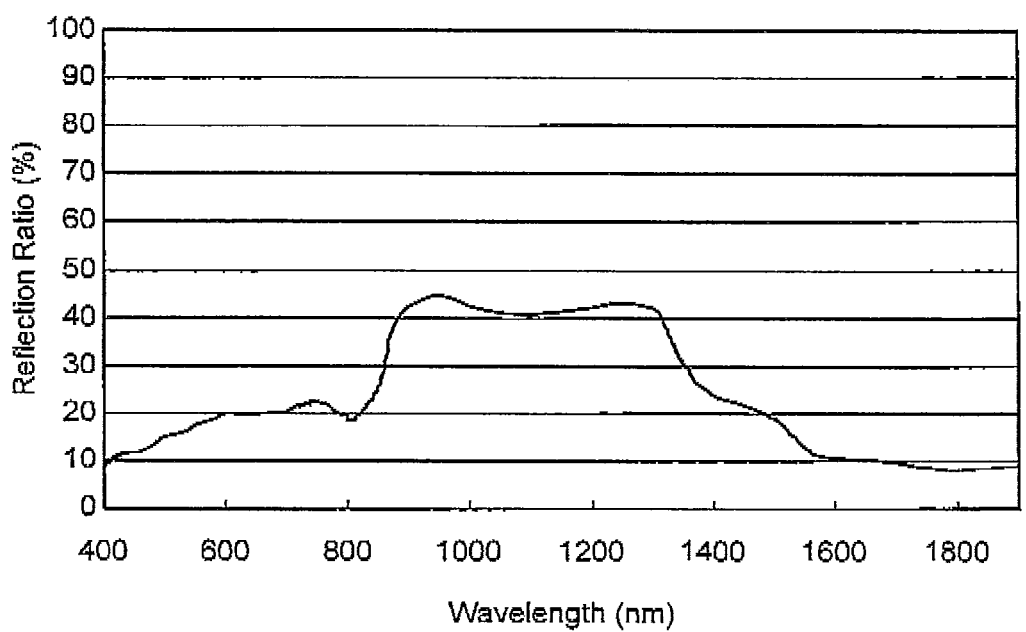
FIG. 12 is a graph showing the reflection spectrum of glass including an infrared reflecting layer measured in Example 2 of the present invention.

The transmission spectrum and reflection spectrum of the produced glass were measured in the same manner as in Example 1 to examine the center wavelength of the reflection band and the bandwidth in which the reflection ratio was 40% or more. The obtained reflection spectrum is shown in FIG. 12, and the values of the results are shown in Table 4.

(2-2) Calculation of Heat Insulation Ratio

The amount of sunlight energy reflected in the wavelength range of 900 nm to 1,300 nm was calculated using the spectra obtained in the light transmittance measurement in (2-1) to calculate a heat insulation ratio. The results are shown in Table 4. The calculation formula (Z) used is as follows.

Heat insulation ratio (%)=(amount of energy reflected in wavelengths of 900 nm to 1,300 nm)/(total amount of energy in wavelengths of 900 nm to 1,300 nm)×100      (Z)

Example 3

The cholesteric resin layer A prepared in (1-1) was subjected to corona treatment, and the corona-treated surface was subjected to rubbing treatment. Then the rubbing-treated surface was coated, using a #8 wire bar, with a nematic liquid crystal composition prepared by mixing components shown in Table 3 in a ratio shown therein. The coating layer was subjected to orientation treatment at 85° C. for 3 minutes and then irradiated with ultraviolet light at 2000 mJ/cm² to form, on the cholesteric resin layer A, a nematic resin layer (½ wavelength layer) that has a phase difference of ½ wavelength. The thickness of the obtained nematic resin layer was 4 μm, and the phase difference Re at a wavelength of 546 nm was 560 nm.

TABLE 3

Composition of nematic resin composition

|  | Nematic liquid crystal composition (parts by weight) |
| --- | --- |
| Polymerizable liquid crystal compound | 40 |
| Polymerization initiator | 3 |
| Surfactant | 0.04 |
| 2-Butanone | 60 |

Details of the components shown in Table 3 are as follows.

i. Polymerizable Liquid Crystal Compound:

As the polymerizable liquid crystal compound, product name LC242 manufactured by BASF was used.

ii. Polymerization Initiator:

As the polymerization initiator, product name IRGACURE 907 manufactured by Ciba Japan K.K. was used.

iii. Surfactant:

As the surfactant, a fluorine-based surfactant (product name: FTERGENT 209F), manufactured by NEOS Company Limited, was used.

The nematic resin layer was then subjected to corona treatment, and the corona-treated surface was subjected to rubbing treatment. Then the rubbing-treated surface was coated, using a #20 wire bar, with the cholesteric liquid crystal composition prepared by mixing the components shown in Table 1 in the ratio shown therein. The same treatment as that for the cholesteric resin layer A was performed to form, on the film, a cholesteric resin layer B having a stacked structure including the two cholesteric resin layers A and the nematic resin layer that is disposed therebetween and has a phase difference of ½ wavelength.

Figure 13:
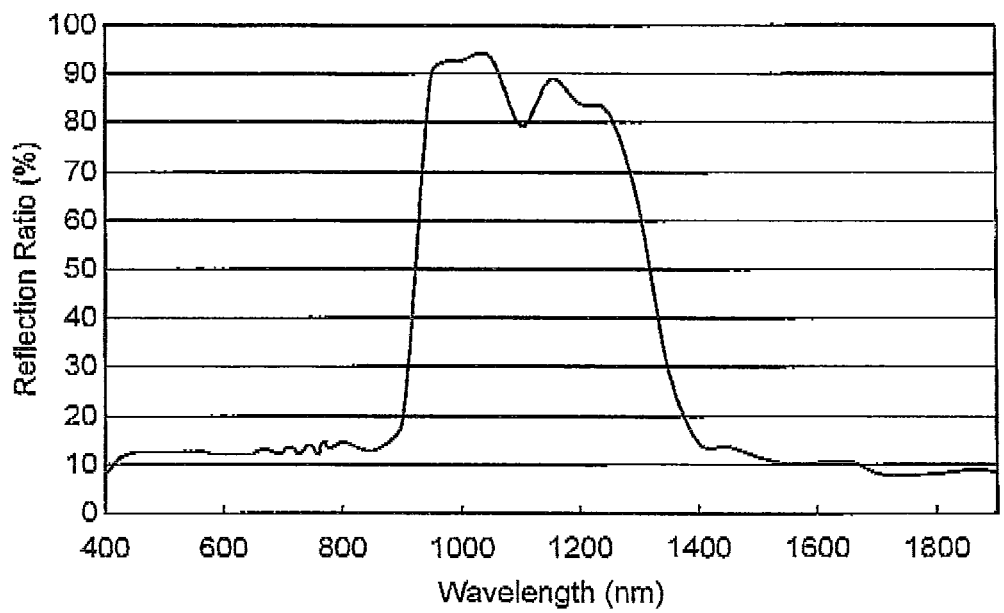
FIG. 13 is a graph showing the reflection spectrum of a cholesteric resin layer B measured in Example 3 of the present invention.

The transmission spectrum and reflection spectrum of the film having the cholesteric resin layer B were measured in the same manner as in Example 1 to examine the center wavelength of the reflection band and the bandwidth in which the reflection ratio was 40% or more. The obtained reflection spectrum is shown in FIG. 13, and the values of the results are shown in Table 4.

The cholesteric resin layer B was peeled off and pulverized in the same manner as in Example 1 to obtain heat insulating flakes B as a heat insulating particulate pigment. The mean particle diameter of the heat insulating flakes B was measured in the same manner as in Example 1 and found to be 60 μm.

Example 4

Components shown in Table 2 were mixed in a ratio shown therein, and the mixture was subjected to dispersion treatment with ultrasonic waves to obtain an infrared reflective coating solution. The infrared reflective coating solution was applied onto a glass plate in the same manner as in Example 2 to produce glass having an infrared reflecting layer with a dry thickness of 80 μm.

Figure 14:
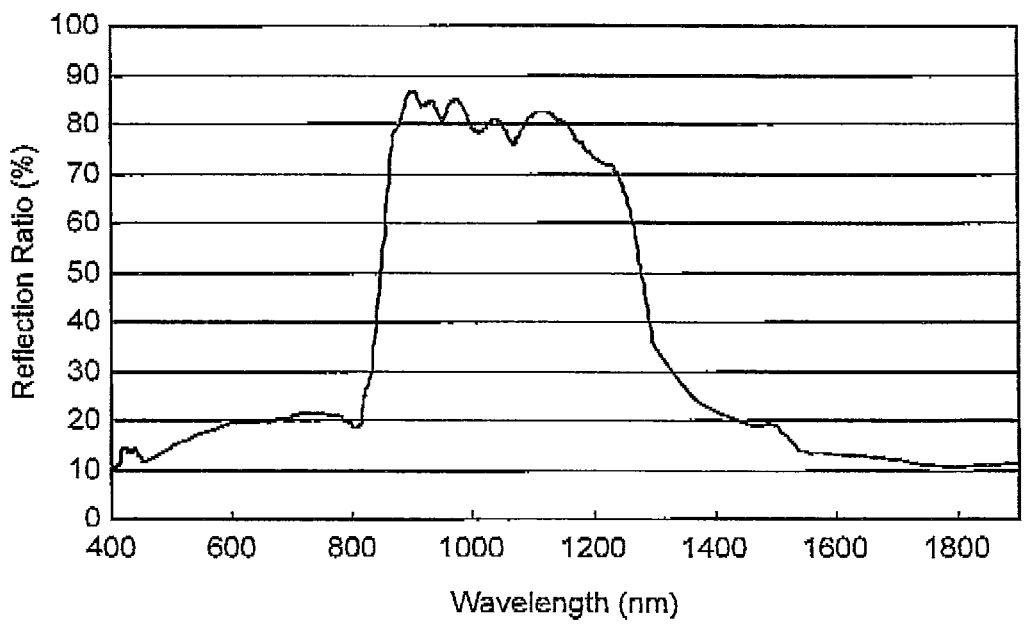
FIG. 14 is a graph showing the reflection spectrum of glass including an infrared reflecting layer measured in Example 4 of the present invention.

The transmission spectrum and reflection spectrum of the produced glass were measured in the same manner as in Example 1 to examine the center wavelength of the reflection band and the bandwidth in which the reflection ratio was 40% or more. The obtained reflection spectrum is shown in FIG. 14, and the values of the results are shown in Table 4.

The heat insulation ratio was calculated in the same manner as in Example 2, and the results are shown in Table 4.

Example 5

The glass having the infrared reflecting layer produced in Example 2 was subjected to heat treatment at 130° C. for 24 hours, and its reflection spectrum was measured. The center wavelength of the reflection band was 1,075 nm, the bandwidth of the band in which the reflection ratio was 40% or more was 430 nm. That is, high heat resistance was achieved. No reduction in transparency of the infrared reflecting layer was found.

Example 6

The glass having the infrared reflecting layer produced in Example 4 was subjected to heat treatment in the same manner as in Example 5, and then its reflection spectrum was determined. The center wavelength of the reflection band was 1,040 nm, the bandwidth of the band in which the reflection ratio was 40% or more was 420 nm. That is, high heat resistance was achieved. No reduction in transparency of the infrared reflecting layer was found.

TABLE 4

| | | Evaluation results | | | |
|---|---|---|---|---|---|
| | | Ex. 1 | Ex. 2 | Ex. 3 | Ex. 4 |
| Cholesteric resin layer | Center wavelength of reflecting band (nm) | 1100 | | 1125 | |
| | Bandwidth in which reflection ratio is 40% or more (nm) | 305 | | 410 | |
| Infrared reflecting layer | Center wavelength of reflecting band (nm) | | 1097.5 | | 1065 |
| | Bandwidth in which reflection ratio is 40% or more (nm) | | 445 | | 450 |
| | Heat insulating ration (%) | | 42.1 | | 76.0 |

SUMMARY

As can be seen from the results in Table 4, the infrared reflecting layers formed using the infrared reflective coating solutions of the present invention have infrared reflection properties comparable to those of the cholesteric resin layers. With the heat insulating particulate pigments and infrared reflective coating solutions of the present invention, a heat insulating layer can be formed using only a simple coating process without using an orientation film and rubbing treatment.

Industrial Applicability

The heat insulating particulate pigments and infrared reflective coating solutions of the present invention can reflect a large amount of infrared radiation having high solar energy and have a high light transmittance in the visible light range. Therefore, the heat insulating particulate pigments and the infrared reflective coating solutions may be preferably used for applications such as heat insulating windows of automobiles, railroads, houses, etc., heat insulation for building materials, and heat insulation for electronic devices.

REFERENCE SIGNS LIST

1,1a-1d: controlled cholesteric resin layer
2: ½ wavelength layer (a layer having a phase difference of ½ wavelength)
3: substrate
4: orientation film
5: sticky bonding agent layer
6: transparent substrate
7: infrared reflecting layer
8: intermediate film
9: air layer
10A-10F: heat insulating particulate pigment
20A-20D: window material

The invention claimed is:

1. A heat insulating particulate pigment comprising a cholesteric resin layer with cholesteric regularity controlled such that, in a wavelength range of 800 nm to 1,900 nm, the cholesteric resin layer has a band of reflecting 40% or more of incident light with a bandwidth equal to or wider than 200 nm,
    wherein the heat insulating particulate pigment is in a flake form having a median volumetric diameter of 5 to 200 μm, and
    the cholesteric resin layer is a layer of cross-linked resin.

2. The heat insulating particulate pigment according to claim 1, wherein the cholesteric resin layer is a resin layer obtained by curing a liquid crystal composition containing a liquid crystal compound having a refractive index anisotropy Δn of 0.21 or more.

3. The heat insulating particulate pigment according to claim 1 comprising two cholesteric resin layers, and a layer disposed between the two cholesteric resin layers and having a phase difference of ½ wavelength.

4. The heat insulating particulate pigment according to claim 1, wherein the cholesteric resin layer is formed from a liquid crystal composition containing a compound represented by the formula (1):

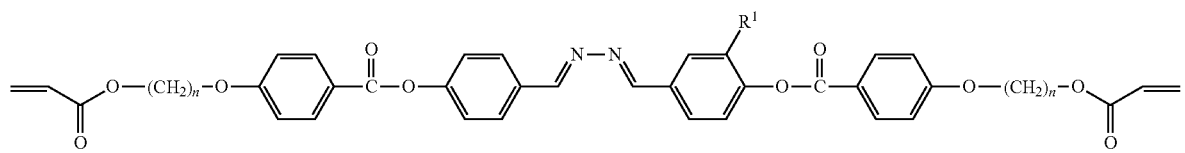

(1)

wherein $R^1$ represents one selected from the group consisting of a hydrogen atom, halogen atoms, alkyl groups having 1 to 10 carbon atoms, —$OR^3$, —O—C(=O)—$R^3$, and —C(=O)—$OR^3$, wherein $R^3$ represents a hydrogen atom or an optionally substituted alkyl group having 1 to 10 carbon atoms, wherein, when $R^3$ is an alkyl group, —O—, —S—, —O—C(=O)—, —C(=O)—O—, —O—C(=O)—O—, —$NR^4$—C(=O)—, —C(=O)—$NR^4$—, —$NR^4$—, or —C(=O)— may be inserted into the alkyl group, excluding the case in which two or more —O—'s or —S—'s are inserted at adjacent sites, wherein $R^4$ represents a hydrogen atom or an alkyl group having 1 to 6 carbon atoms, and each n independently represents an integer from 2 to 12.

5. The heat insulating particulate pigment according to claim 4, wherein the compound represented by the formula (1) is a compound represented by formula (2):

wherein $R^2$ represents an alkyl group having 1 to 10 carbon atoms, and —O—, —S—, —O—C(=O)—, or —C(=O)—O—may be inserted into the alkyl group, excluding the case in which two or more —O—'s or —S—'s are inserted at adjacent sites.

6. An infrared reflective coating solution comprising the heat insulating particulate pigment according to claim 1.

7. An infrared reflecting layer obtained by application and drying of the infrared reflective coating solution of claim 6.

8. The infrared reflecting layer according to claim 7, having a thickness of 15 μm or more and 200 μm or less.

9. The infrared reflective coating solution according to claim 6, further comprising a solvent and a binder component.

10. The infrared reflective coating solution according to claim 9, wherein the solvent contains a ketone organic solvent.

11. The infrared reflective coating solution according to claim 9, wherein the amount of the solvent is 40 parts by weight or more based on 100 parts by weight of the pigment solid content.

12. The infrared reflective coating solution according to claim 9, wherein a difference in refractive index between the heat insulating particulate pigment and the binder component is 0.15 or less.

* * * * *

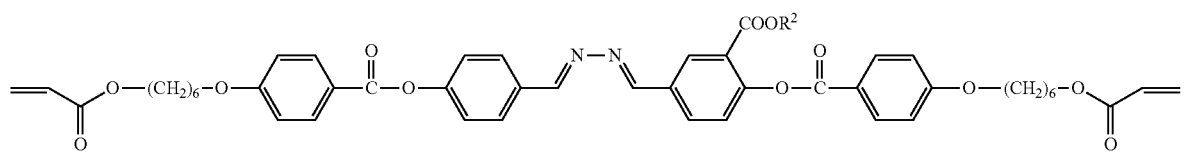

(2)